US012687931B2

(12) United States Patent
Brown et al.

(10) Patent No.: US 12,687,931 B2
(45) Date of Patent: Jul. 21, 2026

(54) ENHANCED SYSTEMS AND METHODS FOR MULTI-PLATFORM ADVERTISING USING HOLOGRAPHIC DISPLAYS, BIOMETRIC INTEGRATION, QUANTUM TECHNOLOGIES, AND DEVICE SYNCHRONIZATION

(71) Applicant: Halo Innovative Solutions, Stone Mountain, GA (US)

(72) Inventors: Kirk Brown, Stone Mountain, GA (US); Casey Teddell Kelly, Stone Mountain, GA (US)

(73) Assignee: Halo Innovative Solutions, Stone Mountain, GA (US)

( * ) Notice: Subject to any disclaimer, the term of this patent is extended or adjusted under 35 U.S.C. 154(b) by 0 days.

(21) Appl. No.: 19/072,959

(22) Filed: Mar. 6, 2025

(65) Prior Publication Data

US 2025/0232338 A1 Jul. 17, 2025

Related U.S. Application Data

(63) Continuation-in-part of application No. 19/021,038, filed on Jan. 14, 2025, now abandoned, which is a
(Continued)

(51) Int. Cl.
*G06Q 30/02* (2023.01)
*G06F 21/32* (2013.01)
(Continued)

(52) U.S. Cl.
CPC ......... *G06Q 30/0277* (2013.01); *G06F 21/32* (2013.01); *G06Q 10/40* (2026.01);
(Continued)

(58) Field of Classification Search
CPC .......... G06Q 30/0277; G06Q 30/0261; G06Q 30/0269; H04N 21/2187; H04N 21/25841;
(Continued)

(56) References Cited

U.S. PATENT DOCUMENTS

| | | | |
|---|---|---|---|
| 2002/0199181 A1 | 12/2002 | Allen | |
| 2006/0085815 A1 | 4/2006 | Nguyen-Tran | |

(Continued)

FOREIGN PATENT DOCUMENTS

| | | | | |
|---|---|---|---|---|
| CA | 2695794 A1 * | 2/2009 | ............. | G06Q 10/10 |

*Primary Examiner* — Scott C Anderson

(57) ABSTRACT

A method of multi-platform social media advertising via digital overlays on real-time video feeds. The method includes providing a host platform, providing third-party social media platforms, providing a host streamer profile managed by the host platform, receiving an advertisement selection with the host platform from the host streamer profile, designating a specific advertisement element from advertisement elements based on the advertisement selection, receiving input through a streamer interface of the host streamer profile to select a subordinate platform from the third-party social media platforms, initializing a real-time video feed associated with the host streamer profile on the host platform, simultaneously broadcasting the real-time video feed to each of the subordinate platform, and outputting, by the host platform, the specific advertisement element as an overlay on the real-time video feed on the real-time video feed. The receiving and the designating are sequentially performed before and/or during the simultaneously broadcasting.

16 Claims, 28 Drawing Sheets

Related U.S. Application Data continuation-in-part of application No. 17/978,066, filed on Oct. 31, 2022, now Pat. No. 12,200,275, which is a continuation-in-part of application No. PCT/US2021/030361, filed on Apr. 30, 2021.

(60) Provisional application No. 63/018,513, filed on Apr. 30, 2020.

(51) Int. Cl.

| | |
|---|---|
| *G06Q 10/40* | (2026.01) |
| *G06Q 30/0241* | (2023.01) |
| *G06Q 30/0251* | (2023.01) |
| *H04N 21/2187* | (2011.01) |
| *H04N 21/258* | (2011.01) |
| *H04N 21/2668* | (2011.01) |
| *H04N 21/431* | (2011.01) |
| *H04N 21/81* | (2011.01) |

(52) U.S. Cl.
CPC ..... *G06Q 30/0261* (2013.01); *G06Q 30/0269* (2013.01); *H04N 21/2187* (2013.01); *H04N 21/25841* (2013.01); *H04N 21/2668* (2013.01); *H04N 21/4316* (2013.01); *H04N 21/812* (2013.01)

(58) Field of Classification Search
CPC ........... H04N 21/2668; H04N 21/4316; H04N 21/812

See application file for complete search history.

(56) References Cited

U.S. PATENT DOCUMENTS

| | | | |
|---|---|---|---|
| 2008/0103879 | A1 | 5/2008 | Armstrong |
| 2011/0078718 | A1 | 3/2011 | Jakobi |
| 2012/0084811 | A1 | 4/2012 | Thompson |
| 2012/0158499 | A1 | 6/2012 | Banadaki |
| 2014/0108509 | A1 | 4/2014 | Almeida |
| 2014/0195675 | A1 | 7/2014 | Silver |
| 2014/0223318 | A1 | 8/2014 | Pefferle |
| 2014/0297394 | A1 | 10/2014 | Li |
| 2015/0242917 | A1 | 8/2015 | Curtis |
| 2017/0201779 | A1 | 7/2017 | Publicover |
| 2018/0234738 | A1 | 8/2018 | Sarkar |
| 2019/0080360 | A1 | 3/2019 | Pan |
| 2019/0141410 | A1* | 5/2019 | Zverina ........... H04N 21/23418 |
| 2019/0197587 | A1 | 6/2019 | Paul |
| 2019/0349619 | A1 | 11/2019 | Hou |
| 2020/0007934 | A1* | 1/2020 | Ortiz ................ H04N 21/25883 |
| 2020/0068262 | A1 | 2/2020 | Saldana |

* cited by examiner

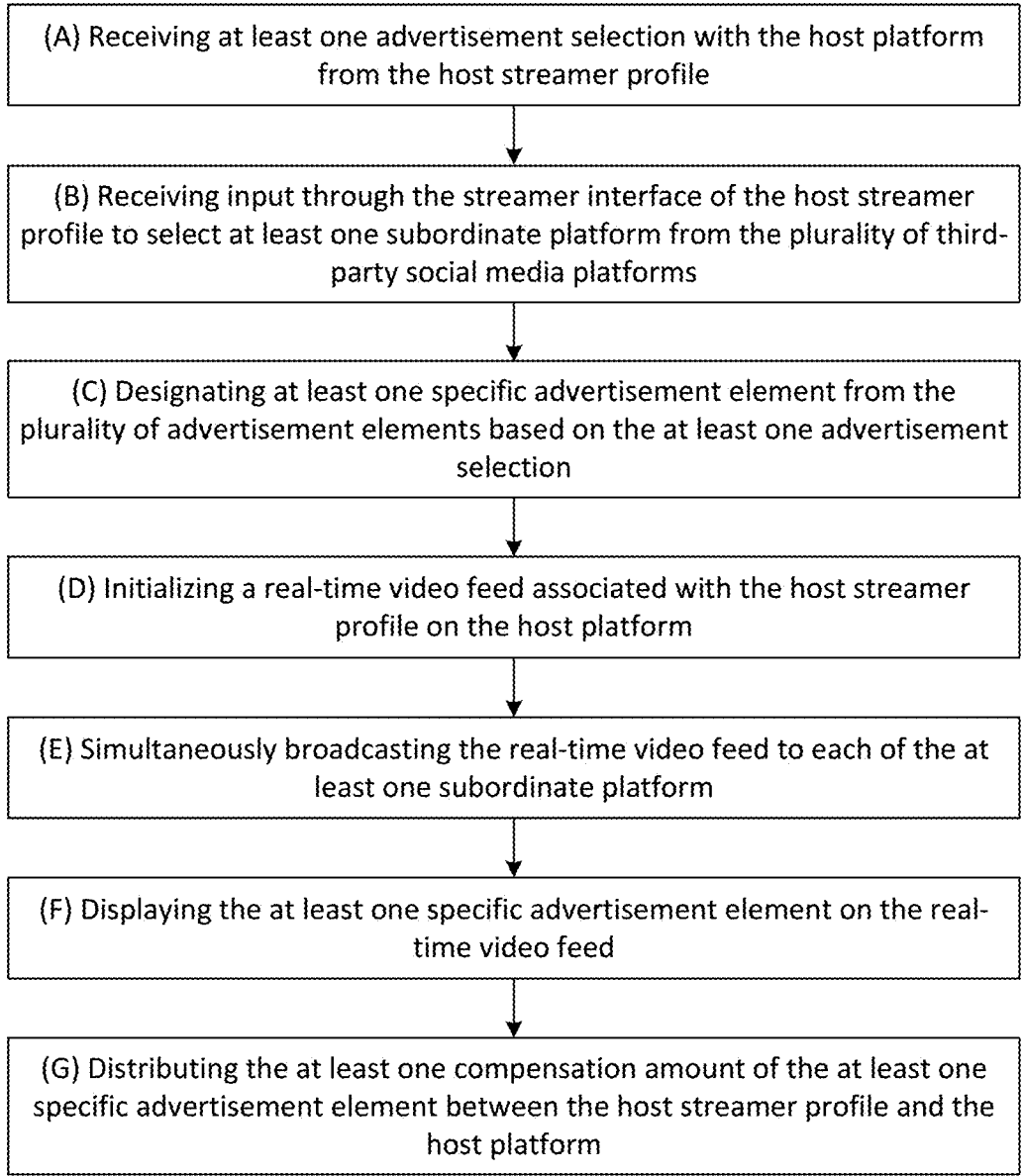

(A) Receiving at least one advertisement selection with the host platform from the host streamer profile (B) Receiving input through the streamer interface of the host streamer profile to select at least one subordinate platform from the plurality of third-party social media platforms (C) Designating at least one specific advertisement element from the plurality of advertisement elements based on the at least one advertisement selection (D) Initializing a real-time video feed associated with the host streamer profile on the host platform (E) Simultaneously broadcasting the real-time video feed to each of the at least one subordinate platform (F) Displaying the at least one specific advertisement element on the real-time video feed (G) Distributing the at least one compensation amount of the at least one specific advertisement element between the host streamer profile and the host platform

FIG. 2

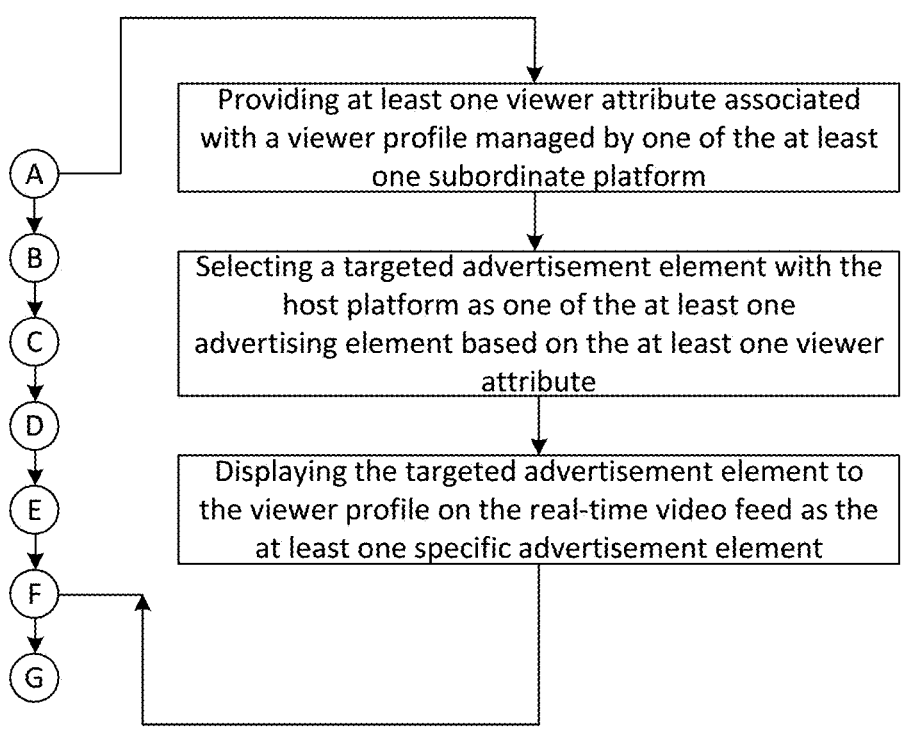

Providing at least one viewer attribute associated with a viewer profile managed by one of the at least one subordinate platform Selecting a targeted advertisement element with the host platform as one of the at least one advertising element based on the at least one viewer attribute Displaying the targeted advertisement element to the viewer profile on the real-time video feed as the at least one specific advertisement element

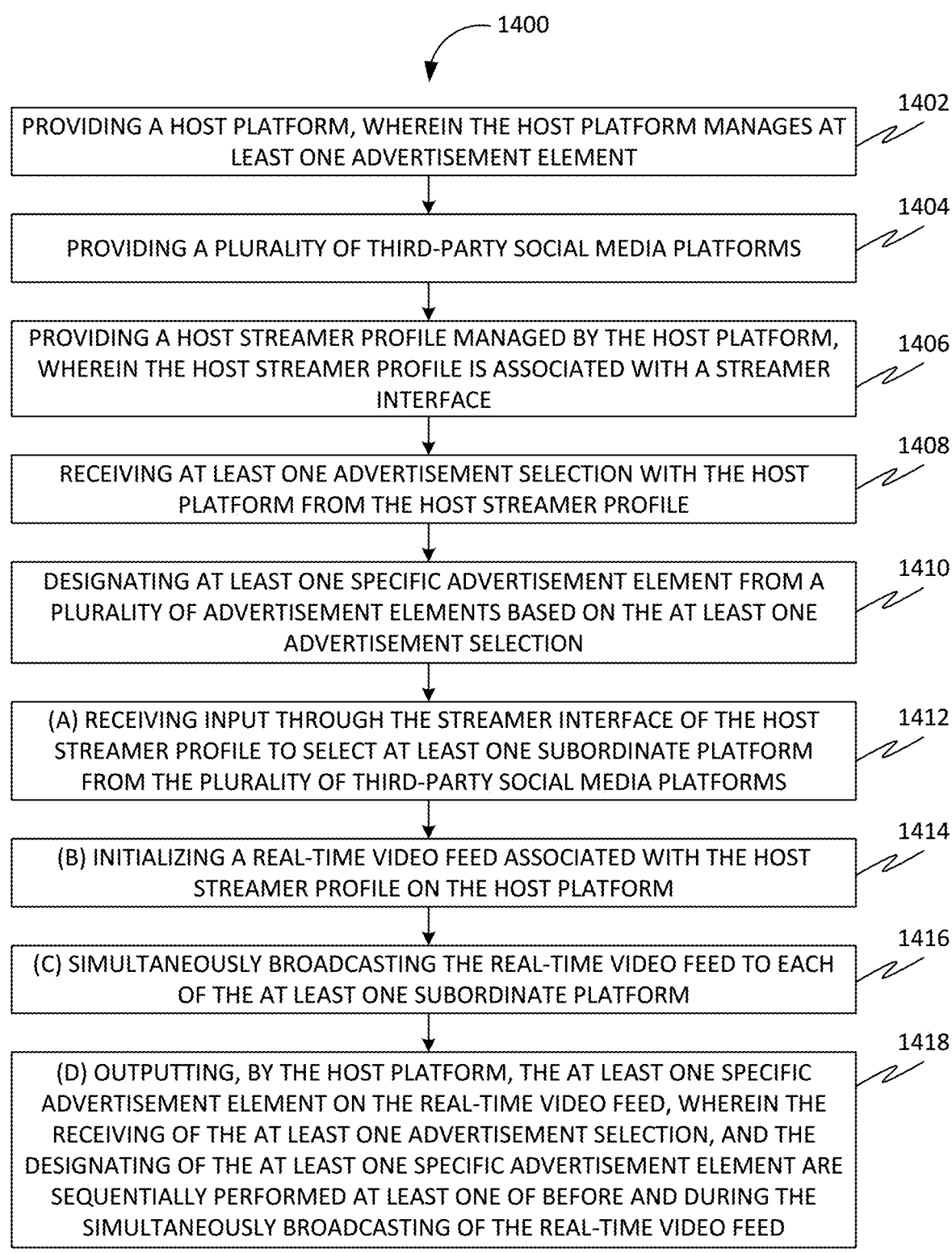

— 1400

PROVIDING A HOST PLATFORM, WHEREIN THE HOST PLATFORM MANAGES AT LEAST ONE ADVERTISEMENT ELEMENT — 1402

PROVIDING A PLURALITY OF THIRD-PARTY SOCIAL MEDIA PLATFORMS — 1404

PROVIDING A HOST STREAMER PROFILE MANAGED BY THE HOST PLATFORM, WHEREIN THE HOST STREAMER PROFILE IS ASSOCIATED WITH A STREAMER INTERFACE — 1406

RECEIVING AT LEAST ONE ADVERTISEMENT SELECTION WITH THE HOST PLATFORM FROM THE HOST STREAMER PROFILE — 1408

DESIGNATING AT LEAST ONE SPECIFIC ADVERTISEMENT ELEMENT FROM A PLURALITY OF ADVERTISEMENT ELEMENTS BASED ON THE AT LEAST ONE ADVERTISEMENT SELECTION — 1410

(A) RECEIVING INPUT THROUGH THE STREAMER INTERFACE OF THE HOST STREAMER PROFILE TO SELECT AT LEAST ONE SUBORDINATE PLATFORM FROM THE PLURALITY OF THIRD-PARTY SOCIAL MEDIA PLATFORMS — 1412

(B) INITIALIZING A REAL-TIME VIDEO FEED ASSOCIATED WITH THE HOST STREAMER PROFILE ON THE HOST PLATFORM — 1414

(C) SIMULTANEOUSLY BROADCASTING THE REAL-TIME VIDEO FEED TO EACH OF THE AT LEAST ONE SUBORDINATE PLATFORM — 1416

(D) OUTPUTTING, BY THE HOST PLATFORM, THE AT LEAST ONE SPECIFIC ADVERTISEMENT ELEMENT ON THE REAL-TIME VIDEO FEED, WHEREIN THE RECEIVING OF THE AT LEAST ONE ADVERTISEMENT SELECTION, AND THE DESIGNATING OF THE AT LEAST ONE SPECIFIC ADVERTISEMENT ELEMENT ARE SEQUENTIALLY PERFORMED AT LEAST ONE OF BEFORE AND DURING THE SIMULTANEOUSLY BROADCASTING OF THE REAL-TIME VIDEO FEED — 1418

FIG. 14

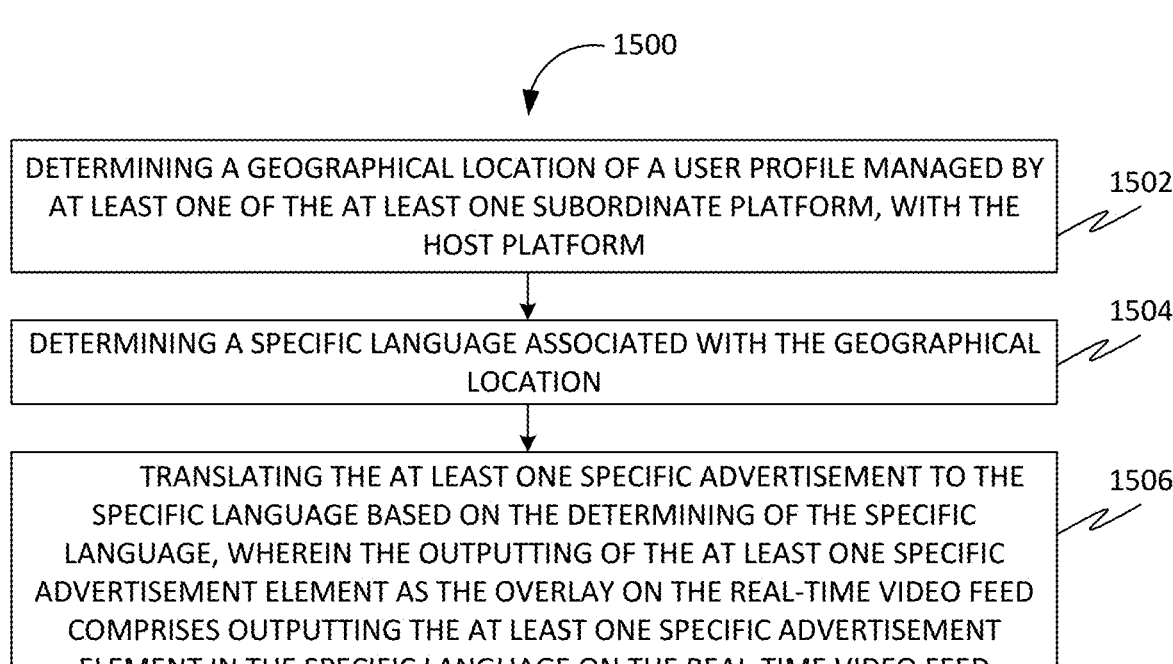

1500

DETERMINING A GEOGRAPHICAL LOCATION OF A USER PROFILE MANAGED BY AT LEAST ONE OF THE AT LEAST ONE SUBORDINATE PLATFORM, WITH THE HOST PLATFORM    1502

DETERMINING A SPECIFIC LANGUAGE ASSOCIATED WITH THE GEOGRAPHICAL LOCATION    1504

TRANSLATING THE AT LEAST ONE SPECIFIC ADVERTISEMENT TO THE SPECIFIC LANGUAGE BASED ON THE DETERMINING OF THE SPECIFIC LANGUAGE, WHEREIN THE OUTPUTTING OF THE AT LEAST ONE SPECIFIC ADVERTISEMENT ELEMENT AS THE OVERLAY ON THE REAL-TIME VIDEO FEED COMPRISES OUTPUTTING THE AT LEAST ONE SPECIFIC ADVERTISEMENT ELEMENT IN THE SPECIFIC LANGUAGE ON THE REAL-TIME VIDEO FEED    1506

FIG. 15

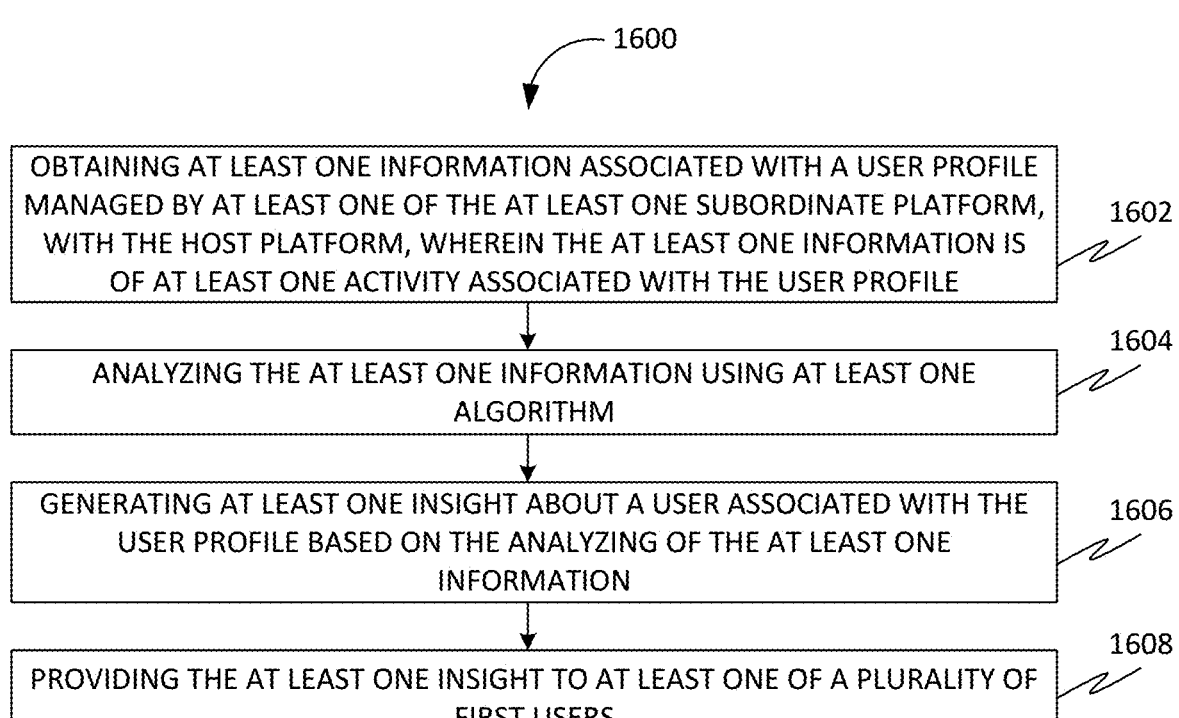

┌─ 1600

OBTAINING AT LEAST ONE INFORMATION ASSOCIATED WITH A USER PROFILE MANAGED BY AT LEAST ONE OF THE AT LEAST ONE SUBORDINATE PLATFORM, WITH THE HOST PLATFORM, WHEREIN THE AT LEAST ONE INFORMATION IS OF AT LEAST ONE ACTIVITY ASSOCIATED WITH THE USER PROFILE — 1602

ANALYZING THE AT LEAST ONE INFORMATION USING AT LEAST ONE ALGORITHM — 1604

GENERATING AT LEAST ONE INSIGHT ABOUT A USER ASSOCIATED WITH THE USER PROFILE BASED ON THE ANALYZING OF THE AT LEAST ONE INFORMATION — 1606

PROVIDING THE AT LEAST ONE INSIGHT TO AT LEAST ONE OF A PLURALITY OF FIRST USERS — 1608

FIG. 16

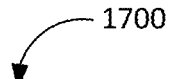

1700

| DETECTING AN INTERACTION OF A USER USING A FIRST DEVICE OF THE PLURALITY OF DEVICES, WHEREIN THE INTERACTION IS ASSOCIATED WITH THE AT LEAST ONE SPECIFIC ADVERTISEMENT ELEMENT, WHEREIN THE FIRST DEVICE IS ASSOCIATED WITH THE AT LEAST ONE SUBORDINATE PLATFORM | 1702 |

| GENERATING A HAPTIC RESPONSE IN REACTION TO THE INTERACTION, THROUGH THE FIRST DEVICE BASED ON THE INTERACTION AND THE AT LEAST ONE SPECIFIC ADVERTISEMENT ELEMENT | 1704 |

FIG. 17

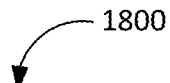
1800

DETECTING A PLURALITY OF INTERACTIONS OF A PLURALITY OF USERS USING A PLURALITY OF SECOND DEVICES OF THE PLURALITY OF DEVICES, WHEREIN THE PLURALITY OF INTERACTIONS IS ASSOCIATED WITH THE AT LEAST ONE SPECIFIC ADVERTISEMENT ELEMENT, WHEREIN THE PLURALITY OF SECOND DEVICES IS ASSOCIATED WITH THE AT LEAST ONE SUBORDINATE PLATFORM, WHEREIN THE PLURALITY OF SECOND DEVICES ARE IN A SHARED ENVIRONMENT — 1802

GENERATING A HAPTIC RESPONSE IN REACTION TO THE PLURALITY OF INTERACTIONS, UNIFORMLY THROUGH THE PLURALITY OF SECOND DEVICES BASED ON THE PLURALITY OF INTERACTIONS AND THE AT LEAST ONE SPECIFIC ADVERTISEMENT ELEMENT — 1804

FIG. 18

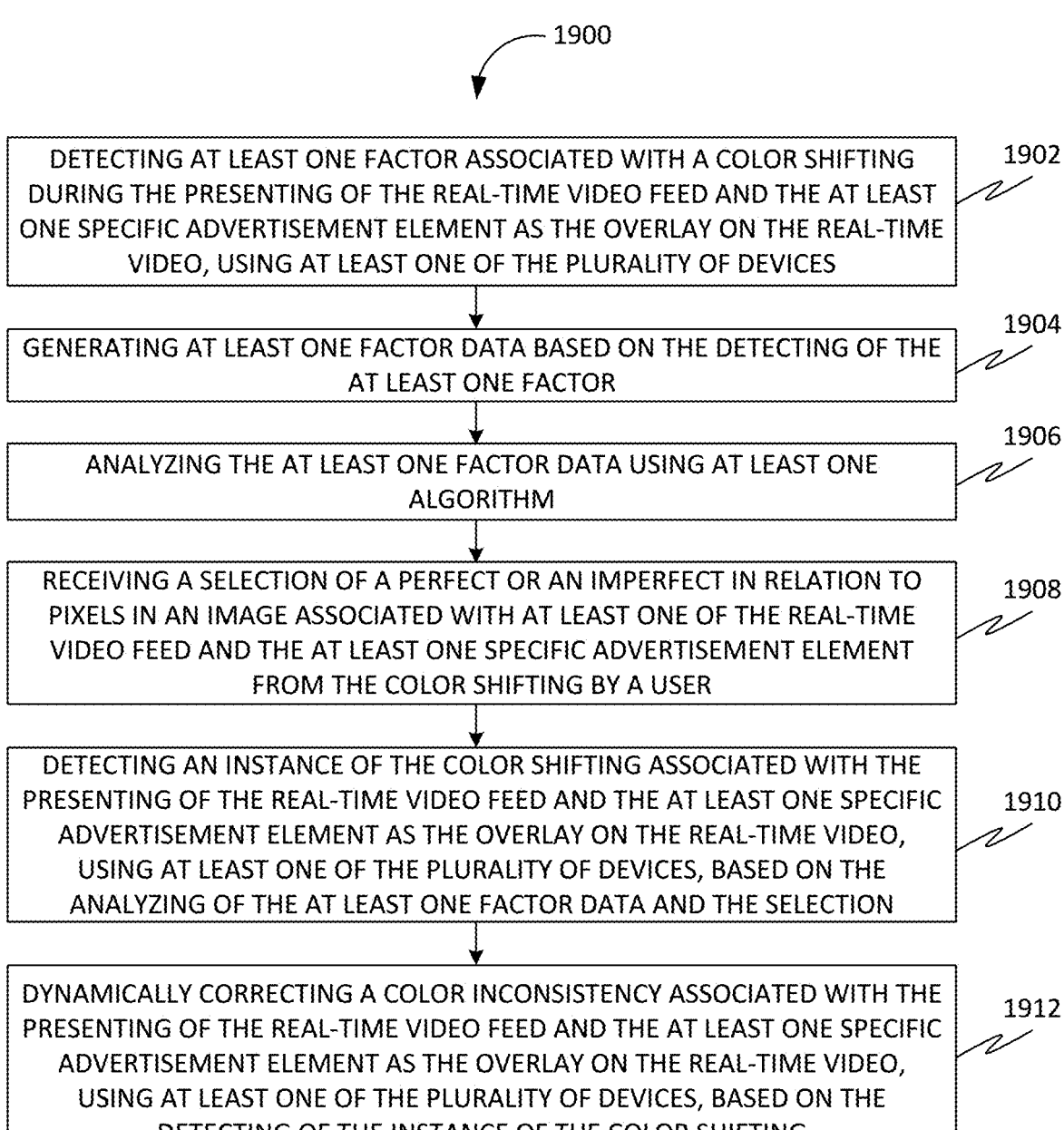

1900

DETECTING AT LEAST ONE FACTOR ASSOCIATED WITH A COLOR SHIFTING DURING THE PRESENTING OF THE REAL-TIME VIDEO FEED AND THE AT LEAST ONE SPECIFIC ADVERTISEMENT ELEMENT AS THE OVERLAY ON THE REAL-TIME VIDEO, USING AT LEAST ONE OF THE PLURALITY OF DEVICES — 1902

GENERATING AT LEAST ONE FACTOR DATA BASED ON THE DETECTING OF THE AT LEAST ONE FACTOR — 1904

ANALYZING THE AT LEAST ONE FACTOR DATA USING AT LEAST ONE ALGORITHM — 1906

RECEIVING A SELECTION OF A PERFECT OR AN IMPERFECT IN RELATION TO PIXELS IN AN IMAGE ASSOCIATED WITH AT LEAST ONE OF THE REAL-TIME VIDEO FEED AND THE AT LEAST ONE SPECIFIC ADVERTISEMENT ELEMENT FROM THE COLOR SHIFTING BY A USER — 1908

DETECTING AN INSTANCE OF THE COLOR SHIFTING ASSOCIATED WITH THE PRESENTING OF THE REAL-TIME VIDEO FEED AND THE AT LEAST ONE SPECIFIC ADVERTISEMENT ELEMENT AS THE OVERLAY ON THE REAL-TIME VIDEO, USING AT LEAST ONE OF THE PLURALITY OF DEVICES, BASED ON THE ANALYZING OF THE AT LEAST ONE FACTOR DATA AND THE SELECTION — 1910

DYNAMICALLY CORRECTING A COLOR INCONSISTENCY ASSOCIATED WITH THE PRESENTING OF THE REAL-TIME VIDEO FEED AND THE AT LEAST ONE SPECIFIC ADVERTISEMENT ELEMENT AS THE OVERLAY ON THE REAL-TIME VIDEO, USING AT LEAST ONE OF THE PLURALITY OF DEVICES, BASED ON THE DETECTING OF THE INSTANCE OF THE COLOR SHIFTING — 1912

FIG. 19

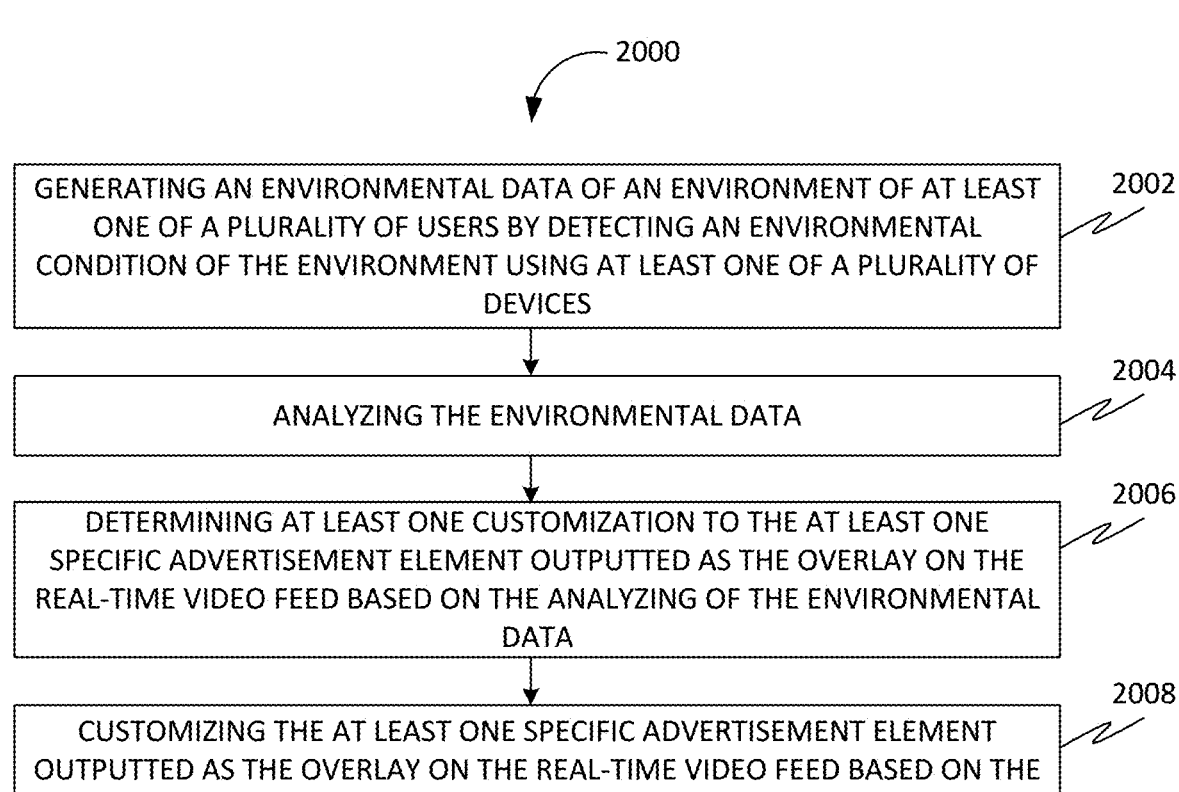

— 2000

GENERATING AN ENVIRONMENTAL DATA OF AN ENVIRONMENT OF AT LEAST ONE OF A PLURALITY OF USERS BY DETECTING AN ENVIRONMENTAL CONDITION OF THE ENVIRONMENT USING AT LEAST ONE OF A PLURALITY OF DEVICES    2002

ANALYZING THE ENVIRONMENTAL DATA    2004

DETERMINING AT LEAST ONE CUSTOMIZATION TO THE AT LEAST ONE SPECIFIC ADVERTISEMENT ELEMENT OUTPUTTED AS THE OVERLAY ON THE REAL-TIME VIDEO FEED BASED ON THE ANALYZING OF THE ENVIRONMENTAL DATA    2006

CUSTOMIZING THE AT LEAST ONE SPECIFIC ADVERTISEMENT ELEMENT OUTPUTTED AS THE OVERLAY ON THE REAL-TIME VIDEO FEED BASED ON THE AT LEAST ONE CUSTOMIZATION    2008

FIG. 20

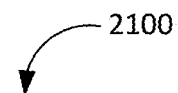
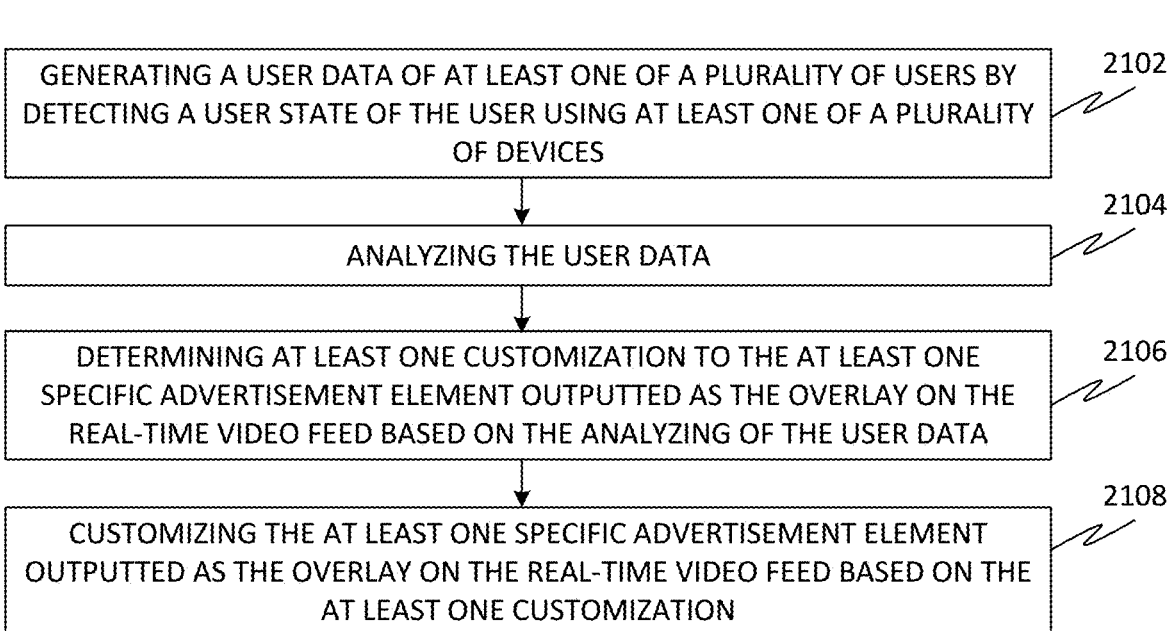
FIG. 21

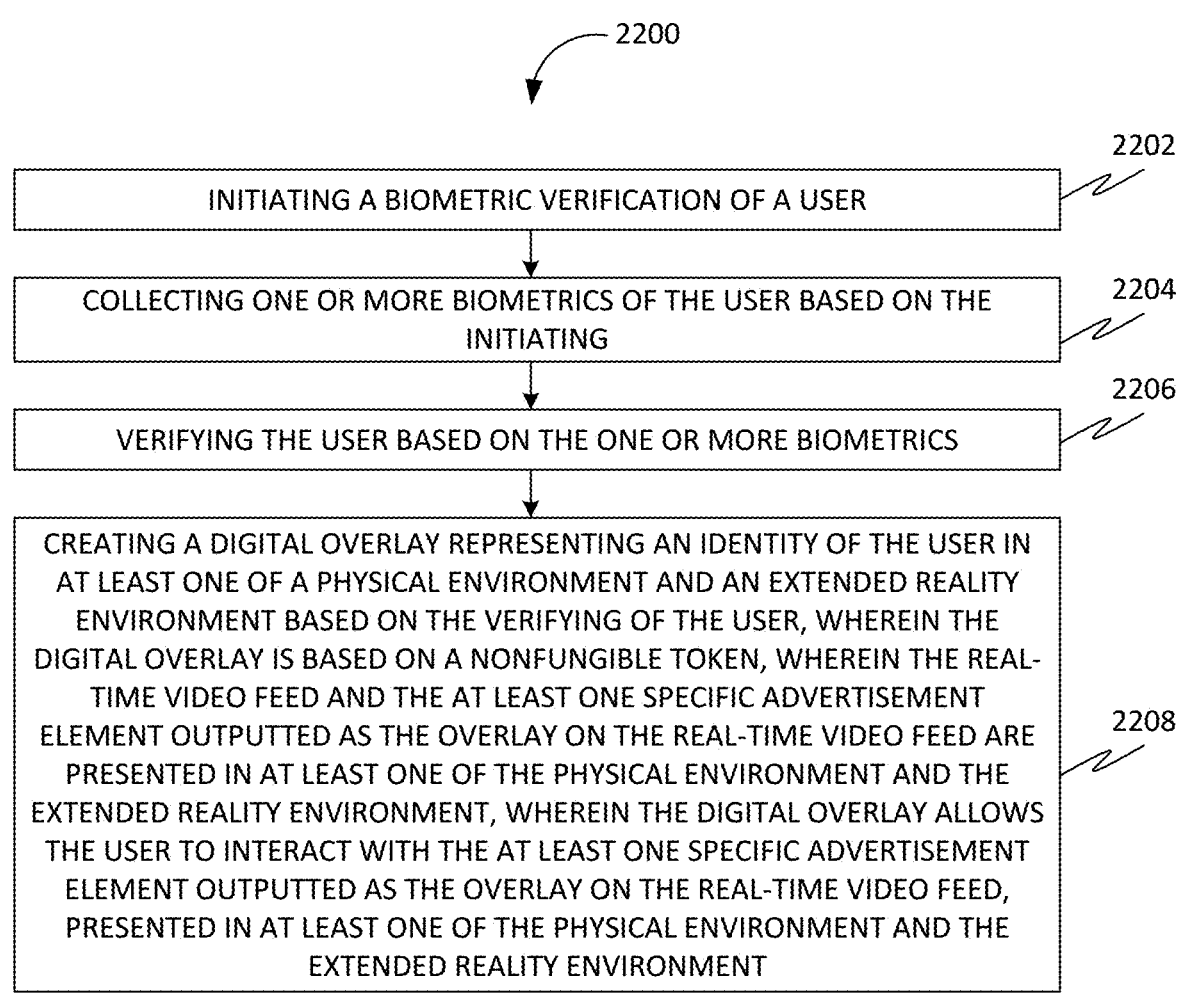

── 2200

2202

INITIATING A BIOMETRIC VERIFICATION OF A USER

2204

COLLECTING ONE OR MORE BIOMETRICS OF THE USER BASED ON THE INITIATING

2206

VERIFYING THE USER BASED ON THE ONE OR MORE BIOMETRICS

2208

CREATING A DIGITAL OVERLAY REPRESENTING AN IDENTITY OF THE USER IN AT LEAST ONE OF A PHYSICAL ENVIRONMENT AND AN EXTENDED REALITY ENVIRONMENT BASED ON THE VERIFYING OF THE USER, WHEREIN THE DIGITAL OVERLAY IS BASED ON A NONFUNGIBLE TOKEN, WHEREIN THE REAL-TIME VIDEO FEED AND THE AT LEAST ONE SPECIFIC ADVERTISEMENT ELEMENT OUTPUTTED AS THE OVERLAY ON THE REAL-TIME VIDEO FEED ARE PRESENTED IN AT LEAST ONE OF THE PHYSICAL ENVIRONMENT AND THE EXTENDED REALITY ENVIRONMENT, WHEREIN THE DIGITAL OVERLAY ALLOWS THE USER TO INTERACT WITH THE AT LEAST ONE SPECIFIC ADVERTISEMENT ELEMENT OUTPUTTED AS THE OVERLAY ON THE REAL-TIME VIDEO FEED, PRESENTED IN AT LEAST ONE OF THE PHYSICAL ENVIRONMENT AND THE EXTENDED REALITY ENVIRONMENT

FIG. 22

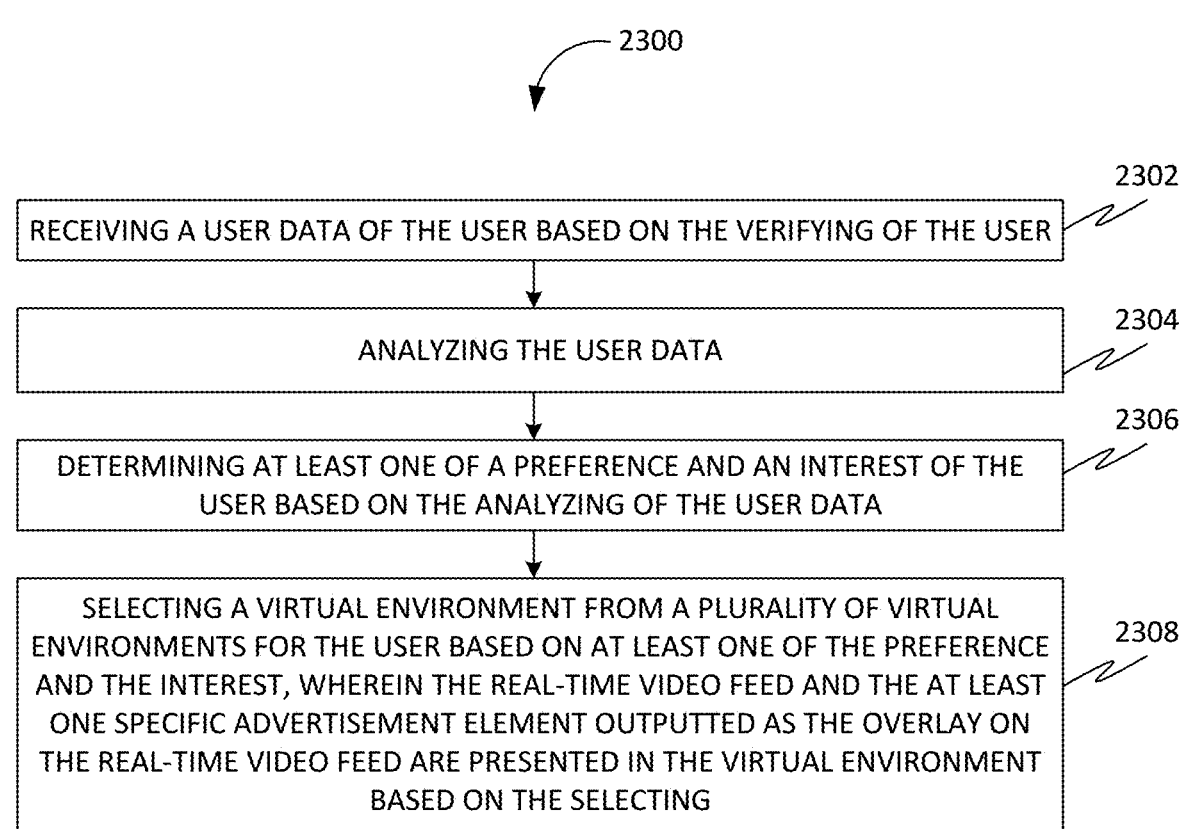

2300

RECEIVING A USER DATA OF THE USER BASED ON THE VERIFYING OF THE USER    2302

ANALYZING THE USER DATA    2304

DETERMINING AT LEAST ONE OF A PREFERENCE AND AN INTEREST OF THE USER BASED ON THE ANALYZING OF THE USER DATA    2306

SELECTING A VIRTUAL ENVIRONMENT FROM A PLURALITY OF VIRTUAL ENVIRONMENTS FOR THE USER BASED ON AT LEAST ONE OF THE PREFERENCE AND THE INTEREST, WHEREIN THE REAL-TIME VIDEO FEED AND THE AT LEAST ONE SPECIFIC ADVERTISEMENT ELEMENT OUTPUTTED AS THE OVERLAY ON THE REAL-TIME VIDEO FEED ARE PRESENTED IN THE VIRTUAL ENVIRONMENT BASED ON THE SELECTING    2308

DETECTING AN INTERACTION OF THE USER PERFORMED THROUGH THE DIGITAL OVERLAY, USING A DEVICE, WHEREIN THE INTERACTION IS ASSOCIATED WITH ONE OR MORE ELEMENTS COMPRISED IN THE AT LEAST ONE SPECIFIC ADVERTISEMENT ELEMENT    2402

ENABLING A PERFORMANCE OF ONE OR MORE ACTIONS THROUGH THE DEVICE BASED ON THE INTERACTION    2404

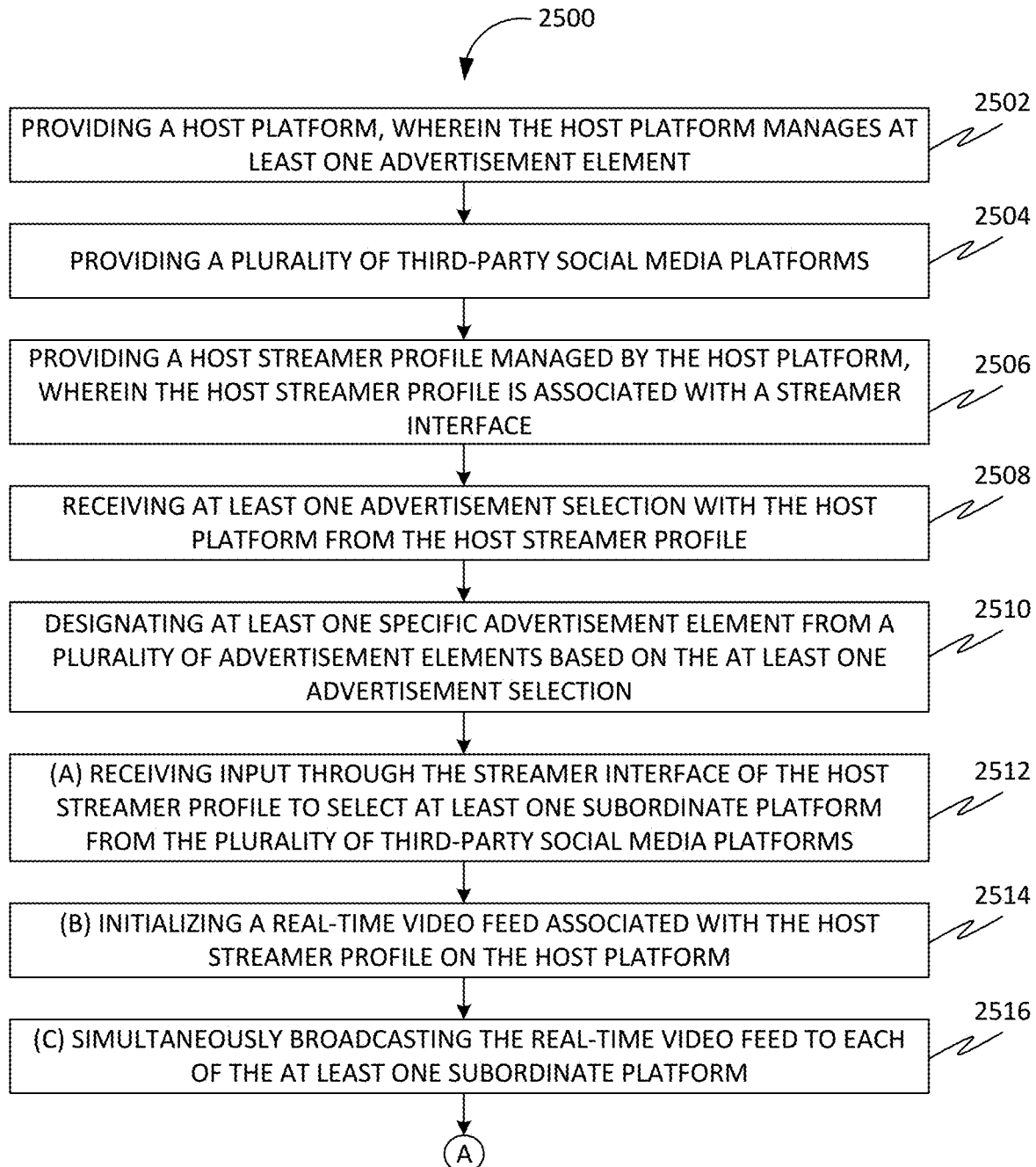

2500

PROVIDING A HOST PLATFORM, WHEREIN THE HOST PLATFORM MANAGES AT LEAST ONE ADVERTISEMENT ELEMENT

2502

PROVIDING A PLURALITY OF THIRD-PARTY SOCIAL MEDIA PLATFORMS

2504

PROVIDING A HOST STREAMER PROFILE MANAGED BY THE HOST PLATFORM, WHEREIN THE HOST STREAMER PROFILE IS ASSOCIATED WITH A STREAMER INTERFACE

2506

RECEIVING AT LEAST ONE ADVERTISEMENT SELECTION WITH THE HOST PLATFORM FROM THE HOST STREAMER PROFILE

2508

DESIGNATING AT LEAST ONE SPECIFIC ADVERTISEMENT ELEMENT FROM A PLURALITY OF ADVERTISEMENT ELEMENTS BASED ON THE AT LEAST ONE ADVERTISEMENT SELECTION

2510

(A) RECEIVING INPUT THROUGH THE STREAMER INTERFACE OF THE HOST STREAMER PROFILE TO SELECT AT LEAST ONE SUBORDINATE PLATFORM FROM THE PLURALITY OF THIRD-PARTY SOCIAL MEDIA PLATFORMS

2512

(B) INITIALIZING A REAL-TIME VIDEO FEED ASSOCIATED WITH THE HOST STREAMER PROFILE ON THE HOST PLATFORM

2514

(C) SIMULTANEOUSLY BROADCASTING THE REAL-TIME VIDEO FEED TO EACH OF THE AT LEAST ONE SUBORDINATE PLATFORM

ENHANCED SYSTEMS AND METHODS FOR MULTI-PLATFORM ADVERTISING USING HOLOGRAPHIC DISPLAYS, BIOMETRIC INTEGRATION, QUANTUM TECHNOLOGIES, AND DEVICE SYNCHRONIZATION

REFERENCE TO RELATED APPLICATIONS

The current application is a continuation-in-part (CIP) application of the U.S. non-provisional application Ser. No. 19/021,038 filed on Jan. 14, 2025 which is a continuation-in-part (CIP) application of the U.S. non-provisional application Ser. No. 17/978,066 filed on Oct. 31, 2022. The U.S. non-provisional application Ser. No. 17/978,066 is a CIP application of the Patent Cooperation Treaty (PCT) application PCT/US2021/030361 filed on Apr. 30, 2021. The PCT application PCT/US2021/030361 claims a priority to the U.S. Provisional Patent application Ser. No. 63/018,513 filed on Apr. 30, 2020.

FIELD OF THE INVENTION

The present invention relates generally to advertising. More particularly, the present invention expands upon displaying advertisements on real-time video feeds distributed across multiple platforms, incorporating advanced technologies such as holographic displays, biometric data processing, quantum computing, and device synchronization to create an interactive and immersive user experience.

BACKGROUND OF THE INVENTION

Typically, a host that is streaming a live video feed must put a lot of effort into the content of the live video feed. The host may need to display an elite skill at something (e.g., cooking a recipe, doing a makeup tutorial, playing an online video game) or convey some sort of planned content (e.g., providing commentary on current events or providing an explanation on complicated subject matters) during the live video feed in order to gather a large number of viewers. However, there does not exist a way to easily monetize the effort put into producing good content for a live video feed and the effort put into generating a large viewership of the live video feed.

Therefore, an objective of the present invention is to provide a system and a method of multi-platform social media advertising via digital overlays on real-time video feeds. Moreover, the incentive for third-party platforms to participate in the present invention is because a compensation for displaying any given advertisement is distributed amongst the participating third-party platforms. Otherwise, the third-party platforms would not have an incentive to allow access to the present invention.

The system and method for overlaying digital advertisements onto live video feeds shared across various social media platforms rely heavily on traditional computational methods and user interaction frameworks. These methods, while effective, lacked the precision, scalability, and interactivity that modern technologies such as quantum computing, holographic projection, and biometric sensing can provide.

Therefore, there is a growing demand for advertising solutions that adapt dynamically to user preferences, ensure secure data exchange, and offer synchronized experiences across multiple devices. The present invention addresses these limitations by incorporating advanced technologies to enhance real-time personalization, security, and interactivity of advertisements.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of multi-platform social media advertising via digital overlays on real-time video feeds, in accordance with some embodiments. Accordingly, the method may include a step of providing a host platform. Further, the host platform manages at least one advertisement element. Further, the host platform uses at least one processing unit to execute computer-executable instructions stored on a non-transitory computer-readable medium. Further, the method may include a step of providing a plurality of third-party social media platforms. Further, the method may include a step of providing a host streamer profile managed by the host platform. Further, the host streamer profile may be associated with a streamer interface. Further, the method may include a step of receiving at least one advertisement selection with the host platform from the host streamer profile. Further, the method may include a step of designating at least one specific advertisement element from a plurality of advertisement elements based on the at least one advertisement selection. Further, the method may include a step A of receiving input through the streamer interface of the host streamer profile to select at least one subordinate platform from the plurality of third-party social media platforms. Further, the method may include a step B of initializing a real-time video feed associated with the host streamer profile on the host platform. Further, the method may include a step C of simultaneously broadcasting the real-time video feed to each of the at least one subordinate platform. Further, the method may include a step D of outputting, by the host platform, the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection, and the designating of the at least one specific advertisement element may be sequentially performed at least one of before and during the simultaneously broadcasting of the real-time video feed.

Further disclosed herein is a method of multi-platform social media advertising via digital overlays on real-time video feeds, in accordance with some embodiments. Accordingly, the method may include a step of providing a host platform. Further, the host platform manages at least one advertisement element. Further, the host platform uses at least one processing unit to execute computer-executable instructions stored on a non-transitory computer-readable medium. Further, the method may include a step of providing a plurality of third-party social media platforms. Further, the method may include a step of providing a host streamer profile managed by the host platform. Further, the host streamer profile may be associated with a streamer interface. Further, the method may include a step of receiving at least one advertisement selection with the host platform from the host streamer profile. Further, the method may include a step of designating at least one specific advertisement element from a plurality of advertisement elements based on the at least one advertisement selection. Further, the method may include a step A of receiving input through the streamer interface of the host streamer profile to select at least one subordinate platform from the plurality of third-party social media platforms. Further, the method may include a step B of initializing a real-time video feed associated with the host streamer profile on the host platform. Further, the method may include a step C of simultaneously broadcasting the real-time video feed to each of the at least one subordinate platform. Further, the method may include a step D of outputting, by the host platform, the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection, and the designating of the at least one specific advertisement element may be sequentially performed at least one of before and during the simultaneously broadcasting of the real-time video feed. Further, the method may include a step of determining a geographical location of a user profile managed by at least one of the at least one subordinate platform, with the host platform. Further, the method may include a step of determining a specific language associated with the geographical location. Further, the method may include a step of translating the at least one specific advertisement element to the specific language based on the determining of the specific language. Further, the outputting of the at least one specific advertisement element as the overlay on the real-time video feed may include outputting the at least one specific advertisement element in the specific language on the real-time video feed.

Further disclosed herein is a system for multi-platform social media advertising via digital overlays on real-time video feeds. Further, the system may include a host platform. Further, the host platform may be configured for managing at least one advertisement element. Further, the host platform uses at least one processing unit to execute computer-executable instructions stored on a non-transitory computer-readable medium. Further, the host platform may be configured for providing a plurality of third-party social media platforms. Further, the host platform may be configured for providing a host streamer profile. Further, the host streamer profile may be managed by the host platform. Further, the host streamer profile may be associated with a streamer interface. Further, the host platform may be configured for receiving at least one advertisement selection from the host streamer profile. Further, the host platform may be configured for designating at least one specific advertisement element from a plurality of advertisement elements based on the at least one advertisement selection. Further, the host platform may be configured for (A) receiving input through the streamer interface of the host streamer profile to select at least one subordinate platform from the plurality of third-party social media platforms. Further, the host platform may be configured for (B) initializing a real-time video feed associated with the host streamer profile on the host platform. Further, the host platform may be configured for (C) simultaneously broadcasting the real-time video feed to each of the at least one subordinate platform. Further, the host platform may be configured for (D) outputting the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection and the designating of the at least one specific advertisement element are sequentially performed at least one of before and during the simultaneously broadcasting of the real-time video feed. Further, at least one of the real-time video feed and the at least one specific advertisement element may be a streaming media.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 2 is a stepwise flow diagram illustrating the general method of the present invention.

FIG. 8 is a stepwise flow diagram illustrating steps for targeting advertisements to viewers in the method of the present invention.

FIG. 14 is a flowchart of a method 1400 of multi-platform social media advertising via digital overlays on real-time video feeds, in accordance with some embodiments.

FIG. 15 is a flowchart of a method 1500 of multi-platform social media advertising via digital overlays on real-time video feeds, in accordance with some embodiments.

FIG. 16 is a flowchart of a method 1600 of multi-platform social media advertising via digital overlays on real-time video feeds, in accordance with some embodiments.

FIG. 17 is a flowchart of a method 1700 of multi-platform social media advertising via digital overlays on real-time video feeds, in accordance with some embodiments.

FIG. 18 is a flowchart of a method 1800 of multi-platform social media advertising via digital overlays on real-time video feeds, in accordance with some embodiments.

FIG. 19 is a flowchart of a method 1900 of multi-platform social media advertising via digital overlays on real-time video feeds, in accordance with some embodiments.

FIG. 20 is a flowchart of a method 2000 of multi-platform social media advertising via digital overlays on real-time video feeds, in accordance with some embodiments.

FIG. 21 is a flowchart of a method 2100 of multi-platform social media advertising via digital overlays on real-time video feeds, in accordance with some embodiments.

FIG. 22 is a flowchart of a method 2200 of multi-platform social media advertising via digital overlays on real-time video feeds, in accordance with some embodiments.

FIG. 23 is a flowchart of a method 2300 of multi-platform social media advertising via digital overlays on real-time video feeds, in accordance with some embodiments.

FIG. 25 is a flowchart of a method 2500 of multi-platform social media advertising via digital overlays on real-time video feeds, in accordance with some embodiments.

DETAILED DESCRIPTION OF THE INVENTION

Figure 1:
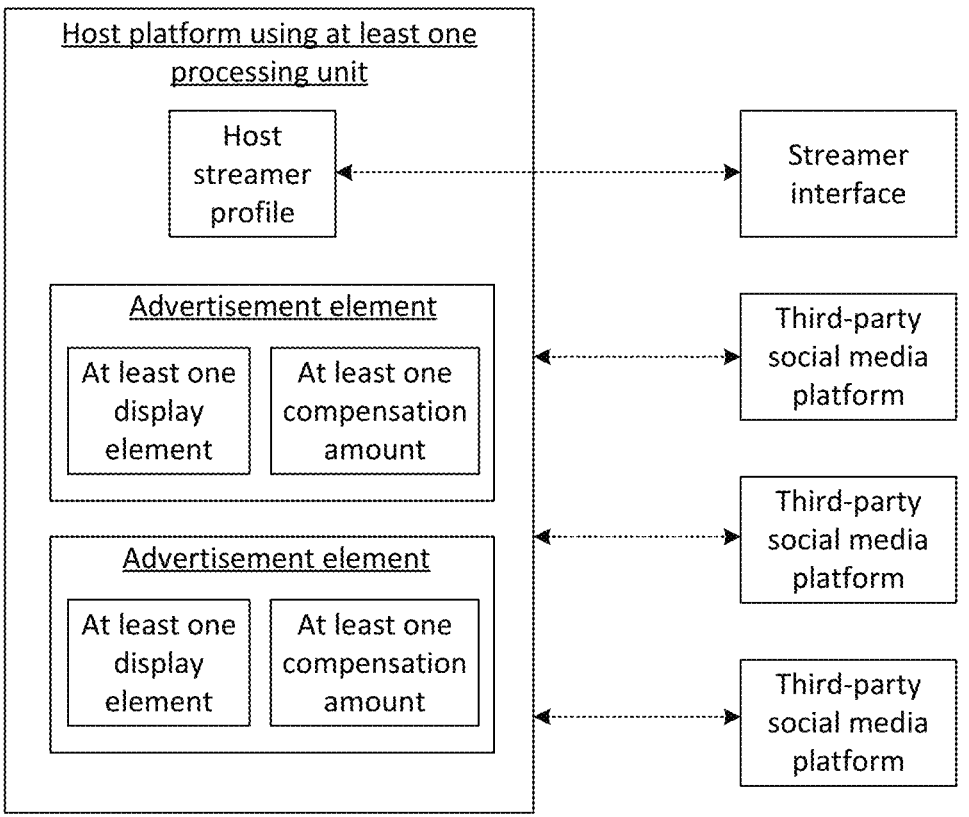
FIG. 1 is a general block diagram of the system of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure the focus of the invention. References herein to "the preferred embodiment", "one embodiment", "some embodiments", or "alternative embodiments" should be considered to be illustrating aspects of the present invention that may potentially vary in some instances and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques or embodiments in an unnecessary fashion. Nevertheless, the specification and claims should be read with the understanding that such combinations are entirely within the scope of the invention and the claims.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

As a preliminary matter, a system consistent with an embodiment of the disclosure may include a computing device, cloud service, augmented reality cloud service, or distributed computing service such as a computing device. In a basic configuration, the computing device may include at least one processing unit and a system memory. Depending on the configuration and type of computing device, the system memory may comprise, but is not limited to, volatile (e.g., random-access memory (RAM)), non-volatile (e.g., read-only memory (ROM)), quantum technologies, flash memory, or any combination. The system memory may include an operating system, one or more programming modules, and may include program data. The operating system, for example, may be suitable for controlling the computing device's operation. In one embodiment, the programming modules may include an authentication module, image-processing module, machine learning module and/or image classifying module. The focus fast system can be used with supervised and unsupervised machine learning. Furthermore, embodiments of the disclosure may be practiced in conjunction with a graphics library, other operating systems, or any other application program and is not limited to any particular application or system. In general, it should be understood that the method and system of the present invention may be enabled through any known or new electronic computing devices, technologies, networks, accessories, programming languages, or any other apparatus, process, or other aspects relevant to enabling the present invention. Furthermore, embodiments may include new technologies such as but not limited to quantum technologies.

The present invention may be generally understood to be enabled through a self-contained system of computing devices, other hardware, software programs, and any other components required to enable the proper functionality of the present invention as disclosed herein. The present invention may be understood to be initialized on a host media platform, wherein the user interacts initially with the host platform in order to engage the functionalities of the present invention disclosed here. After the user has signed on, the user can access a plurality of digital advertising content access points; this interoperable system of multiple network access points enables the user to teleport from a host platform environment to multiple secondary environment content.

Overview

The present disclosure describes a method of multi-platform social media advertising via digital overlays on real-time video feeds.

Further, the present disclosure describes displaying advertisements on a live video feed distributed across multiple social media platforms, AR/VR environments, and physical locations without compromising performance.

Further, the present disclosure describes a system that delivers haptic feedback in real-time video feeds with digital overlays, wherein the haptic feedback is produced in reaction to user interactions with overlay components, therefore augmenting user engagement through tactile sensations that match the presented information.

Further, the present disclosure describes a method for synchronizing haptic feedback across multiple devices that exhibit digital overlays on real-time video feeds, encompassing the steps of detecting user interactions, generating corresponding haptic signals, and ensuring uniform tactile responses across devices within a shared environment.

Further, the present disclosure describes a system that manages user interactions in interest-based online environments using customizable digital overlays linked to NFTs and biometric verification to ensure privacy, personalization, and secure engagement.

Further, the present disclosure describes enhancing user interactions in mixed-reality environments by categorizing them into chatrooms, displaying digital overlays as identity shields, and offering interactive features like haptic feedback and holographic elements for immersive experiences.

Further, the present disclosure describes a system that through a device that's able to use holographic imagery and an enhanced transducer that creates a better haptic experience, a holographic imagery comprised of dense light is produced that may interact with physical environments. Therefore, an individual may feel, taste, see, and sense through their senses this haptic holographic imagery and the holographic imagery may also interact with the individual. Further, an advertisement device of the system may cast the holographic imagery that the individual may feel. Further, the holographic imagery may be made interactive using software such that it can pick things up. Further, the holographic imagery may be made to be controlled and have it do things. The advertisement device that allows for interactive holographic imagery (interactive haptic holographic imagery) does not have to be stationary either.

Further, the present disclosure describes digital overhead holographic display devices that are used to generate one or more holographic images. For example, one or more devices located on a street display a digital holographic image of a city's speed limit. When a person drives towards the image, they will see the hologram display of the city's speed limit or an Advertisement of a local restaurant logo and/or commercial as digital overlay.

Further, the present disclosure describes holographic representations that may perceive and touch physical individuals using reversed haptic technology in an unlimited environment. The hologram (holographic representation) may detect and respond to a person's presence, movement, and physiological signals using LIDAR, ultrasonic waves, and biofeedback technologies. Technology like focused sound waves, air pressure, or programmable smart materials can transfer tactile sensations onto the skin to replicate touch. This would let the hologram "reach out" and connect with reality. Robotic arms, plasma fields, or quantum sensors could supply the hologram physical feedback to "feel" a human. A holographic projection (holographic representation) might perceive textures, pressure, and temperature as a tangible entity. The hologram might learn to distinguish between mild and strong touch or react emotionally with AI and emotional feedback systems. These developments would make the hologram appear intelligent and able to interact with humans physically and sensorily. Ultra-advanced sensing, interacting physics fields, and intelligent algorithms would be needed to reverse haptic technology to let holograms touch people. Light-based projections would merge with physical entities to create a tangible, interactive holographic being.

Further, the present disclosure describes creating an advatar of a person in their image. Further, the advatar may be an advertisement of self. Further, the advertisement devices may work and all environments. People or things may create an image of self-casting it as holographic imagery with haptics and task it to do things because of the dense nature of the increase of pressure (air, sound, etc.) from the advertisement devices.

Further, the disclosed method and system include a holographic display system. Further, the holographic display system may include devices capable of projecting 3D holographic advertisements that interact with users through gestures, voice commands, and other biometric inputs. Further, the holographic display system uses ultrasonic haptics (ultrahaptics) to provide tactile feedback, creating an immersive interaction between users and holographic content. Further, the holographic advertisements may be projected in both virtual and physical environments using advanced holographic projectors. This system allows for interactive 3D advertisements that can be viewed from multiple angles and interacted with through hand gestures or speech. Further, the ultrasonic haptics technology of the holographic display system provides tactile feedback, allowing users to "feel" holographic objects as they interact with the advertisement. For instance, a user could feel the texture of a product being advertised, enhancing engagement and creating a memorable experience.

Further, the disclosed method and system include biometric data integration. Further, the biometric data integration includes real-time analysis of biometric data such as facial expressions, heart rate, and voice tone to dynamically adapt the content of holographic advertisements to user emotions and preferences. Further, the biometric data integration enables biometric-triggered advertisement adjustments, such as changes in product suggestions or advertisement visuals based on detected user interest or disinterest. Further, the biometric sensors used for the biometric data integration capture user-specific data, such as facial microexpressions, heart rate, and voice pitch, to tailor advertisements dynamically. This real-time feedback loop ensures that advertisements remain relevant and engaging, increasing the likelihood of user interaction and conversion. For example: a user smiling at an advertisement for a product may trigger an instant discount offer, and a detected rise in heart rate during interaction could signal excitement, prompting further engagement opportunities, etc.

Further, the disclosed method and system include quantum computing and sensors. Further, an application of quantum computing for rapid biometric data analysis ensures real-time personalization of advertisements. Further, the quantum sensors may be used for ultra-precise environmental and biometric detection, to enable the system to adjust advertisements based on subtle user inputs or environmental conditions. Further, the quantum computing accelerates the processing of biometric and environmental data, enabling the system to deliver personalized holographic content in real-time. Further, the quantum sensors provide ultra-sensitive detection capabilities, such as identifying microexpressions or subtle voice modulations. These sensors enhance the precision of biometric data analysis, ensuring that advertisements respond accurately to user input.

Further, the disclosed method and system include device synchronization and secure data exchange. Further, the device synchronization and secure data exchange include quantum-assisted synchronization to ensure seamless interaction and display continuity across multiple devices (e.g., smartphones, AR glasses, public holographic displays, etc.). Further, the quantum encryption is for the secure exchange of biometric data and other sensitive information between devices and platforms. Further, the device synchronization and secure data exchange use quantum communication protocols through which devices participating in the system may synchronize holographic content seamlessly. Whether on AR glasses, smartphones, or public displays, all devices show identical content in real-time. Further, the quantum encryption ensures the secure transmission of biometrics and other sensitive data. For example, when a user interacts with a holographic QR code, their personal data is encrypted using quantum methods, protecting it from interception or misuse.

Further, the disclosed method and system include scanability and interactivity. Further, the scanability and interactivity may include the integration of holographic QR codes or other scannable elements within advertisements, allowing users to interact with the advertisement to retrieve more information or complete transactions. Further, the scanability and interactivity may include device-to-device data transfer, which is facilitated by secure protocols, enabling users to share advertisement content or interact with it collaboratively. Further, the scanability and interactivity allow the holographic advertisements to feature scannable elements, such as dynamic QR codes or interactive hotspots. Users can scan these elements with their devices to retrieve detailed information, complete transactions, or share content with others. Further, the system also supports device-to-device interaction, allowing multiple users to collaboratively engage with a holographic advertisement or share information between devices securely.

Further, the disclosed method and system include environmental adaptability. Further, the environmental adaptability may include using quantum sensors and AI algorithms to analyze real-time environmental data (e.g., lighting, crowd density) and adjust advertisements for maximum visibility and engagement. Further, the environmental adaptability may include context-aware holographic content delivery, and tailoring advertisements to the user's physical surroundings. In the environmental adaptability, the system employs quantum sensors and AI algorithms to analyze the user's environment based on real-time conditions, such as ambient light or crowd density and adjusts the brightness, size, or content of holographic ads to maximize visibility and relevance. For example: in a crowded environment, the hologram may increase its brightness or incorporate attention-grabbing animations, advertisements displayed at night may adopt softer lighting to avoid visual strain, etc.

Further, the disclosed method and system include cross-platform scalability. Further, the cross-platform scalability may include a usage of cloud-based quantum processing for efficient delivery of personalized advertisements to thousands of users simultaneously without performance degradation. Further, the cross-platform scalability may allow compatibility with existing social media platforms and emerging AR/VR ecosystems. Further, the cross-platform scalability may include using quantum-enhanced cloud computing which enables the system to process and deliver personalized advertisements to thousands of users simultaneously. In the cross-platform scalability, the system ensures real-time responsiveness and scalability by leveraging quantum parallelism. This functionality allows businesses to deploy the system across various social media platforms, AR/VR environments, and physical locations without compromising performance.

Further, the disclosed method and systems may include the following:

1. Augmented Reality (AR) Leyline Mapping System: Real-time visualization of Leylines using digital overlays. Interactive AR pathways guiding users to energy nodes with haptic feedback signaling proximity.

2. Holographic Storytelling Experiences: Use of holograms to narrate the cultural, spiritual, and historical significance of Leylines in real time or via pre-recorded videos.

3. Mood-Responsive Advertising: The use of biometric analysis algorithms to detect user mood via facial expressions and voice patterns to deliver tailored content.

4. Geo-Targeted AR/VR Advertising: Adapting advertisement to the user's geographical location on Leylines, offering local services and promotions.

5. Holographic Events and Commerce: creating pop-up holographic marketplaces or events at Leyline sites, integrated with live-streaming and advertising.

6. Token-Based Revenue Sharing: implementing a Leyline token economy, distributing compensation based on user engagement with holographic ads or content.

7. Virtual Leyline Exploration: Offering immersive VR/AR Leyline tours, with integrated overlays showcasing sponsored products or historical facts.

8. Interactive Leyline CRM Dashboard: A Leyline-focused CRM system that tracks user interaction data, generates insights, and connects advertisers with users based on proximity and mood.

9. Cross-Platform Holographic Syndication: Allowing simultaneous streaming of holographic content across multiple platforms while dynamically adjusting ads per platform.

10. Customizable AR Advertising for Subordinate Platforms: Enabling advertisers to tailor AR holographic overlays for subordinate streaming platforms, with real-time control over content.

11. Dynamic Viewer-Based Content Customization: Adjusting holographic content based on viewer attributes like preferences, engagement history, and location.

12. Multi-Layered Holographic Advertising: Displaying independent ads in distinct layers within the same holographic projection for different platforms or audiences.

13. Holographic Affiliate Marketing: Integrating an affiliate program into the AR/VR system, allowing businesses to advertise through holograms and split revenue based on conversions.

14. Emotion-Driven Leyline Narratives: Combining mood analysis with AR storytelling, creating unique narratives tailored to user emotions.

15. Holographic Pinning of Web Hyperlinks: Allowing advertisers to pin interactive links to holographic objects on Leylines, driving traffic to their online platforms.

16. Leyline Data Analytics Platform: A backend system that collects data from AR/VR interactions, providing detailed reports to advertisers and platform owners.

17. Gamified Leyline Engagement: Introducing AR games where users explore Leylines, earning tokens or rewards for interacting with holographic content.

18. Interactive CRM Notifications: CRM integration allows sending location-based or mood-based push notifications through AR interfaces.

19. Holographic Cross-Promotion Partnerships: Allowing multiple advertisers to collaborate on holographic experiences, sharing ad space and revenue.

20. Dynamic Multilingual Content Adaptation: Using AI to translate holographic content into the user's preferred language in real time.

Further, the integration of holographic displays, biometric data, and quantum technologies offers several key advantages:

1. Enhanced User Engagement: Interactive holograms and biometric responsiveness create immersive experiences that captivate users.

2. Improved Security: Quantum encryption ensures the protection of user data and advertisement content.

3. Real-Time Personalization: Refers to the process of dynamically tailoring content, recommendations, or experiences to individual users based on their preferences, behaviors, and contextual data—instantly as they interact with a platform or system. This process uses a combination of data collection, analytics, and AI-driven decision-making to adapt and optimize the user's experience in real time.

In general, referring to FIG. 1, the present invention is a new form of multimedia distribution and digital advertising content and metadata for Internet marketing, social media marketing, and Geospatial and Geo fencing marketing. In some embodiments, the present invention may be known as Focus Fast ads. The present invention is a new form of multimedia distribution of digital advertising content and metadata. This method of advertisement allows a host streamer profile to receive incentives (monetary or otherwise) with or without participating third-party media platforms by posting advertisement content to or from a participating platform or a plurality of participating platforms, enabling multi-cloud and multiplatform connectivity over any network.

This process allows sharing of advertising (ad) revenue between a host platform of the present invention, a user understood for the purposes of illustration to be engaging with the functionalities of the present invention through a host streamer profile registered with the host platform of the present invention, and a plurality of participating third-party social and live streaming platforms further registered and prepared to interact with the host platform of the present invention. This system allows each participant to receive a percentage of advertising revenue that is generated in this system. The user allows real-time advertisements to be displayed across live streams from a user's digital identifier (host streamer profile) to be broadcast to a plurality of linked digital identifiers on participating third-party platforms. In advertising, an individual's personal identity may be articulated and interpreted through the User handle identifier as fluid identity, relative identity, absolute identity, Identity of self-hood, Projective identity, cultural identity, gender, identity, social identity, psychological identity, economic identity, ethical identity, and temporal identity. Utilizing a digital overlay of oneself as a brand identity in advertising involves amalgamating one's own appearance with the company's visual components to convey a cohesive and identifiable identity. This method may successfully personalize your brand, foster deeper relationships with your audience, and establish trust by integrating your personal identity with your brand messaging.

The method may use fluid identity, relative identity, absolute identity, and identity as selfhood, for facilitating customized and dynamic brand communication.

Incentives are based on the type of advertisement being broadcast, the advertisement length, advertisement content and advertisement time and cost, but are not limited to these factors. In some embodiments, participating platforms may only receive shares of revenue when initial user selects them from a list of participating platforms.

In order to enable the method of the present invention, a host platform is provided. The host platform manages a plurality of advertisement elements, wherein each of the plurality of advertisement elements is associated with at least one display element and at least one compensation amount, and wherein the host platform uses at least one processing unit to execute computer-executable instructions stored on a non-transitory computer-readable medium. The specific nature of the plurality of advertisement elements is purposefully left generally vague herein in order to accommodate a wide variety of different attributes, elements, and other factors that may potentially be desirable for use in various embodiments of the present invention.

In an embodiment, WiFi connection or hotspots, a dialup Internet connection, cable modem, DSL, mobile Internet, broadband, cable, satellite, ISDN, T1 lines, T3 lines, optical carrier, and the like, through an Internet service provider and an Internet browser application installed on the computing device in order to access the functionality of the present invention.

Fundamentally, however, each of the plurality of advertisement elements is a digital, visual element. Examples of the type of digital visual elements that may make up an advertisement element include, but are not limited to: 2D, 3D, multidimensional images, NFT content, holograms, still or motion graphic in actual reality or augmented reality, virtual reality, mixed reality, CGI, VFX, SFX or after effect overlays. Advertisement overlays may be transparent or have a certain opacity to the overlays. Some advertisements may include text, image, or video with audio. In a crowded environment, the hologram may increase its brightness or incorporate attention-grabbing animations. The system employs quantum sensors and AI algorithms to analyze the user's environment. Based on real-time conditions, such as ambient light or crowd density, the system adjusts the brightness, size, or content of holographic advertisements to maximize visibility and relevance. The advertisement overlays may be accompanied with different types of streamers' overlays such as, but not limited to, webcam overlays, informational overlays, augmented reality overlays, sponsor overlays, stream label overlays, game overlays, and talking screen overlays.

The present invention may further include recognition of advertising information. Advertising information may be in the form of audio, visual, audiovisual, textual, and haptic content, among others. The audio element may be musical, spoken, or other audio. Visual content may include visually consumable content which may contain multidimensional imaging. Said multidimensional imaging may include two or more spatial dimensions and may also include a time dimension. Superimposed animated multidimensional images may be used as source user identification. Fluid identity, relative identity, absolute identity, and self-hood are detectable digital representations under the present invention.

All parties to the present invention such as users, advertisers, and third parties may utilize advertising material and secret data with a unique identifier to share immersive and interactive physical reality or extended reality in real and/or virtual worlds. Audio visualization, data visualization, and virtualization as used in the present invention may make use of device cameras and motion sensors to project virtual and physical content into a user's view. Sensors may also be installed on devices related to the present application such as wearable devices. These sensors may measure energy generation, temperature, weather, and other measurements as needed to improve operation and visualization. Virtual models can be used to run simulations, evaluate performance difficulties, and suggest improvements to real physical objects and spaces. Digital copies of objects such as autos, real estate, art, apparel, and others may be used as advertising content in the current invention's system and method. Digital copies can be created using image manipulation and modification techniques.

Each of the plurality of advertisement elements is further associated with one or more compensation amounts or means, wherein said compensation amounts or means are initialized in the system of the present invention as a reward for displaying its corresponding advertisement element on a live video stream. Further, after an advertisement element is displayed on a live stream, the at least one compensation amount is distributed to both the live streamer and any third-party platforms they may be further streaming to. The compensation amount may vary according to various attributes as desired in various embodiments, and/or designated in accordance with each individual advertisement element. The compensation amount, or incentive(s), may be based on factors such as, but not limited to, the type of advertisement being broadcast, the advertisement length, advertisement content and advertisement time and cost, or other relevant factors.

Further, a plurality of third-party media platforms is provided. Further, a host streamer profile is provided, wherein the host streamer profile is managed by the host platform, wherein the host streamer profile is associated with a streamer interface. Finally, before the general method of the present invention can begin, the user to interact with the present invention must access the Internet via a digital device, such as, but not limited to, a personal computing device, a smartphone, tablet, wearable devices, smart glasses, public holographic displays or any other suitable computing device. The computing device of the user may access the Internet or spatial web through any applicable means, such as, but not limited to, a WiFi connection or hotspot, a dialup Internet connection, cable modem, DSL, mobile Internet, broadband, cable, satellite, ISDN, T1 lines, T3 lines, optical carrier, and the like, through an Internet service provider and an Internet browser application installed on the computing device in order to access the functionality of the present invention. Further, alternative means through which the user may directly connect to elements of the present invention may include, but are not limited to, cloud computing with a virtual private network to access the server(s) of the present invention through an encrypted connection, a remote desktop server, a virtual desktop infrastructure, or other applicable means.

In general, one or more computing devices may be used to carry out the method described herein. This may be a server computer connected to client devices over a network such as the Internet. Specific computing setups using devices such as desktop computer, laptop, tablet, personal digital assistant, portable electronic device, wearable computer, smart phone, Internet of Things (IoT) device, smart electrical appliance, game console, rack server, super-computer, quantum server, mainframe computer, mini-computer, micro-computer, blockchain server, IPFS server, and storage may act as the one or more client devices and/or the server computer in the above-outlined setup. These devices may be set up to run software, including, but not limited to, an operating system (e.g., Windows, Mac OS, Unix, Linux, Android, etc.), to provide a user interface (e.g., GUI, touchscreen based interface, voice based interface, gesture based interface, etc.) for use by the one or more users and/or a network interface for interacting with other devices over the network. In light of this, the server computer may include a processing device for processing data, such as, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. The server computer may also come equipped with a communication tool for connecting to one or more external devices. The one or more external devices could be anything from a client device to a third-party database to a public database to a private database, among other things. The communication device may also be set up to communicate with one or more external devices through a variety of routes. A wireless communication channel and/or a wired communication channel may also be included in the one or more communication channels. As a result, the communication device may be set up to carry out one or more electronic information transmissions and receptions. A storage device set up to carry out data storage and/or retrieval operations may also be present on the server computer. In general, the storage device may be set up to offer dependable digital information storage. As a result, the storage device may, in certain implementations, be built using technologies like data compression, data backup, data redundancy, data deduplication, error correction, data fingerprinting, role-based access control, and so on. The storage device may also be configured as volatile or non-volatile storage for secret data encrypted keys as a form of security for connection authorization and transaction validation. The storage device may operate through centralized cloud storage, interplanetary file system storage, digital wallet storage, stored value card, or decentralized blockchain storage, according to some embodiments.

In the general method of the present invention as illustrated in FIG. 2, at least one advertisement selection is received with the host platform from the host streamer profile (step A). Input is then received through the streamer interface of the host streamer profile to select at least one subordinate platform from the at least one media platform (step B). Further, the at least one media platform may include a plurality of third-party social media platforms. Wherein the host streamer profile initiates a real-time video feed on the host platform, each subordinate platform essentially plays the role of repeating or copying the real-time video feed from the host platform, with some potential exceptions in different embodiments, as will be discussed hereinafter. At least one specific advertisement element is designated from the plurality of advertisement elements based on the at least one advertisement selection (step C). The at least one specific advertisement element corresponds to one or more (hence "at least one") advertisement elements to be displayed on the real-time video feed. The determining, or selection process, of the at least one specific advertisement element may vary in different circumstances and/or in different embodiments, as will be discussed hereinafter.

Subsequently, a real-time video feed associated with the host streamer profile is initialized on the host platform (step D), the real-time video feed is simultaneously broadcast to each of the at least one subordinate platform (step E), and the at least one specific advertisement element is displayed on the real-time video feed (step F) as the real-time video feed is simultaneously broadcast to each of the at least one subordinate platform.

The multifarious superimposed digital content advertisement displayed on-screen within a social media network/platform and/or to a plurality of social networking platforms is broadcast with various types of superimposed digital content advertisement that is integrated into the video content as overlay advertising which may appear at any desired location, such as, but not limited to, the bottom, top, left, right or center of the user device screen during a live stream or recorded broadcast of user content.

Finally, the at least one compensation amount of the at least one specific advertisement element is distributed between at least the host streamer profile and the host platform (step G). More specifically, in some embodiments and/or circumstances, the at least one compensation amount of the at least one specific advertisement element is distributed among the host streamer profile, the host platform, and each of the at least one social media platform.

In various embodiments, the specific nature of the real-time video feed may vary. In some embodiments, the real-time video feed is a live-stream video feed, wherein the live-stream video feed continually receives video input from the host streamer profile. The continually received video input may be received through a digital image capture device, such as, but not limited to, a digital camera or webcam attached to a computing device used to interact with the host platform of the present invention through the host streamer profile. Alternatively, in some embodiments, the real-time video feed may be a real-time broadcast of a prerecorded or pre-edited video file. In various embodiments, the real-time video feed may stream any type of video with the present invention.

Figure 3:
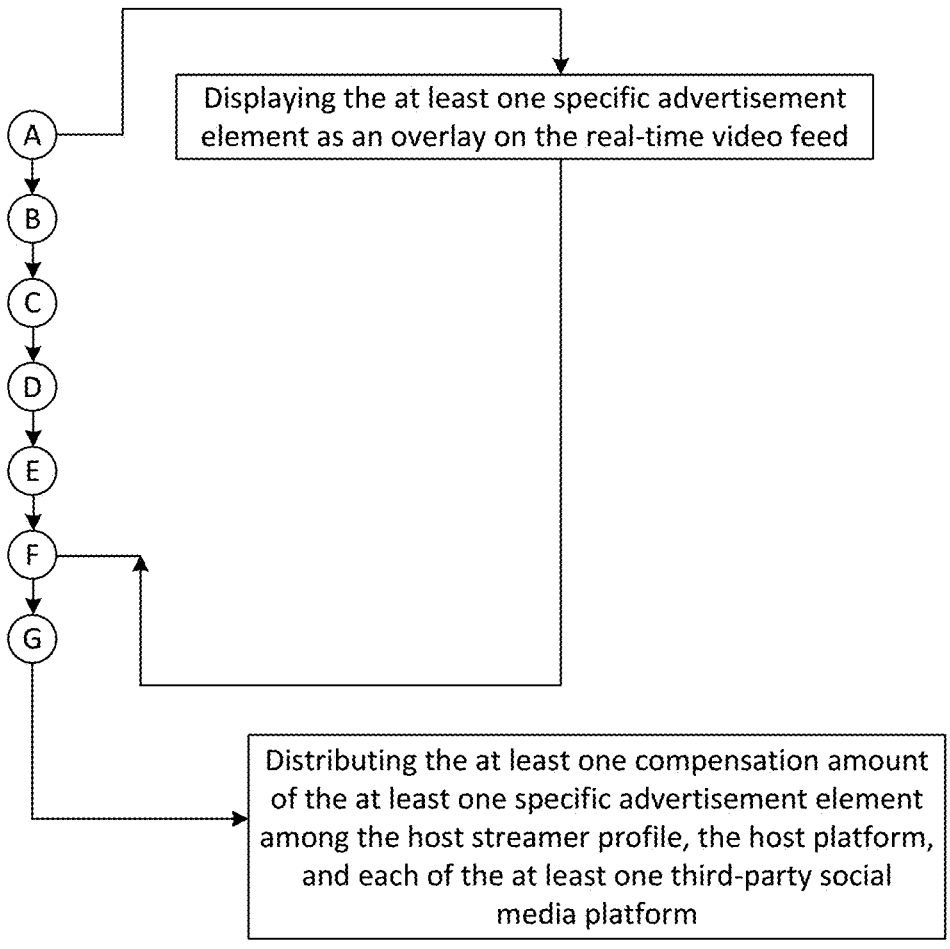
FIG. 3 is a stepwise flow diagram illustrating steps for displaying the at least one specific advertisement and further distributing the at least one compensation amount in the method of the present invention.

In the preferred embodiment of the present invention, the at least one specific advertisement element may be displayed in any suitable manner and/or form on the real-time video feed. In the preferred embodiment, the at least one specific advertisement element is displayed as an overlay on the real-time video feed, as shown in FIG. 3. The real-time video feed may remain unchanged by the displaying of the at least one advertisement element, or in some embodiments, an advertisement element may include one or more functionalities of modifying the real-time video feed itself, through means such as, but not limited to, stretching, shrinking, color shifting, warping, or any other relevant visual video effects.

Further, in the preferred embodiment, a color shifting in pixel-based display systems may be managed and corrected. In pixel-based display systems. Color shifting occurs when the perceived color of a pixel changes due to factors such as viewing angle, lighting conditions, or subpixel misalignment. The described system employs real-time monitoring and adaptive algorithms to analyze and adjust pixel color values dynamically. By integrating machine learning models, the system can detect and correct color inconsistencies, ensuring accurate and consistent color representation across various display environments. This method improves image fidelity, reduces perceptual artifacts, and enhances the overall viewing experience, especially in high-resolution displays like LED, LCD, QNED, QLED, and OLED screens. Holographic technologies, especially digital and computational holography, often rely on voxel or pixel liked elements to store, manipulate, and display the holographic data.

In some embodiments, as described herein for pixel-based display systems and holographic projection technologies, the light source may include organic light-emitting diodes (OLEDs) or equivalent emissive display devices, in place of or in addition to laser-based illumination. In certain implementations, a metasurface optical layer, including but not limited to arrays of subwavelength structures, may be integrated with or positioned adjacent to the display to modulate light phase, amplitude, or polarization at the pixel level.

This configuration, consistent with the display technologies and adaptive control systems disclosed herein, enables compact, low-power, high-resolution holographic projection suitable for mobile devices, wearable displays, AR glasses, and other platforms described in the present specification. The system may present advertisement elements, interactive overlays, or other content in real-time, with ownership, licensing, and distribution rights managed through blockchain or NFT-based mechanisms as otherwise disclosed.

Figure 4:
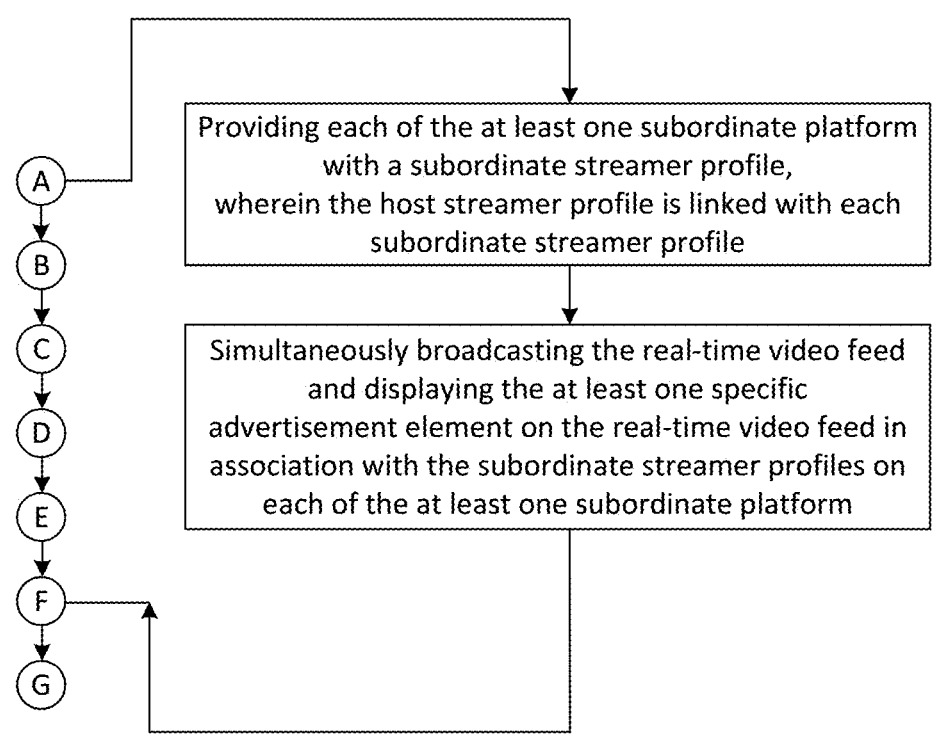
FIG. 4 is a stepwise flow diagram illustrating steps for displaying advertisements on the real-time video feed in the method of the present invention.

Further, in the preferred embodiment, each of the at least one subordinate platform is provided with a subordinate streamer profile, wherein the host streamer profile is linked with each subordinate streamer profile. This may be accomplished through any suitable means, such as, but not limited to, an application programming interface (API) and Real-Time Messaging Protocol (RMTP), or any other suitable and relevant means for enabling suitable communication between the host platform and each of the at least one subordinate platform. Further, as shown in FIG. 4, the real-time video feed is simultaneously broadcast and the at least one specific advertisement element is displayed on the real-time video feed in association with each of the subordinate streamer profiles on each of the at least one subordinate platform.

In some embodiments and/or circumstances, in order to determine the at least one advertisement selection, a category selection may be received as one of the at least one advertisement selection. A list of matching advertisement elements from the plurality of advertisement elements to may then be displayed the host streamer profile, wherein each of the list of matching advertisement elements corresponds to the category selection. In various embodiments, the category selection may correspond to any suitable and relevant category. For example, the category selection may correspond to the streamer's mood. If the streamer's mood is happy, they may click a "happy" option from a list of categories, or they may type the word "happy" into a search field, as desired in different embodiments. Thus, advertisements from the mood query and a list of advertisers with cheerful products or service will formulate. Further, the category selection may correspond to a specific field, or hobby; for example, American football. Thus, upon receiving a category selection corresponding to American football, advertisements may populate a list displayed to the streamer profile related to the subject of American football.

In the preferred embodiment, the user associated with the host streamer profile can choose advertisements to run which have the best incentives. This process helps the user select advertisements that align with the mood of their live stream presentation or incentive level.

These advertisements can differ in visual presentation and time length. The advertisement may be strategically placed over the user's live stream in time intervals during a live broadcast or prerecorded video that is multicast, simulcast, geo-cast, or recast to a plurality participating platform. A Focus Fast geographic information system of the present invention may give advertisers the most accurate insight to plan direct advertising campaigns by customer purchasing patterns for customer targeting by demographic or geographic locations. Artificial intelligence, machine learning, and advanced analytics will help direct advertisements based on the geographical location of viewers. For example, if a user is watching from a non-english speaking country, the advertisement will be broadcast to them in a native language such as Hindi, Spanish, Cantonese, etc. Focus Fast advertisement does not stop, pause, or break up the user's live stream feed.

These advertisements can differ in visual presentation and time length, such as but not limited to advertisements placed on moveable or non-movable object surfaces for brand placement like virtual clothing, autos, or objects displaying brand identifiers. The advertisement may be identifiable at continuous verifiable points or strategically placed over the user's live stream in time intervals during a live broadcast or prerecorded video that is multicast, simulcast, geo-cast, or recast to a plurality participating platform. Advertisement visualization may be in the form of data visualization, audio visualization, virtual machines, digital twins, hypervisors, and others. The source user may receive digital assets, currency, or other transferred earned benefits for the digital advertising content. A geographic information system of the present invention may also give advertisers the most accurate insight to plan direct advertising campaigns by customer purchasing patterns for customer targeting by demographic or geographic locations. Artificial intelligence, machine learning, and advanced analytics will help directing advertisements based on the geographical location of viewers. For example, if a user is watching from a non-English speaking country, the advertisement will be broadcast to them in a native language such as Hindi, Spanish, Cantonese, etc. Focus Fast advertisement does not stop, pause, or break up the user's live stream feed. The Focus Fast Ad overlay system is designed to enhance user immersive experience within actual reality, virtual reality, or augmented reality by displaying advertisement elements such as but not limited to independent and dependent brand identifiers for a service or product.

In some embodiments, as described herein for advertisements placed on movable or non-movable object surfaces (including virtual clothing, autos, and other brand placement objects), such surfaces may further include physical garments such as shirts, hats, shoes, jackets, or other wearables. Advertisement elements may comprise digital images, video, 3D assets, or holographic projections, presented statically or dynamically, and triggered by environmental, biometric, or movement-based inputs as otherwise disclosed.

Content may be rendered directly on physical apparel using integrated or attachable display materials, including but not limited to flexible display fabrics, electrochromic surfaces, or micro-display modules, or virtually superimposed using AR, MR, or holographic systems described herein. Positional tracking may maintain alignment with the garment's location and orientation.

Interactive layers may respond to viewer engagement, and blockchain or NFT features, as disclosed in the present specification, may govern ownership, licensing, or monetization. This supports direct-view and enhanced-view delivery, enabling seamless integration between physical and virtual environments.

Figure 5:
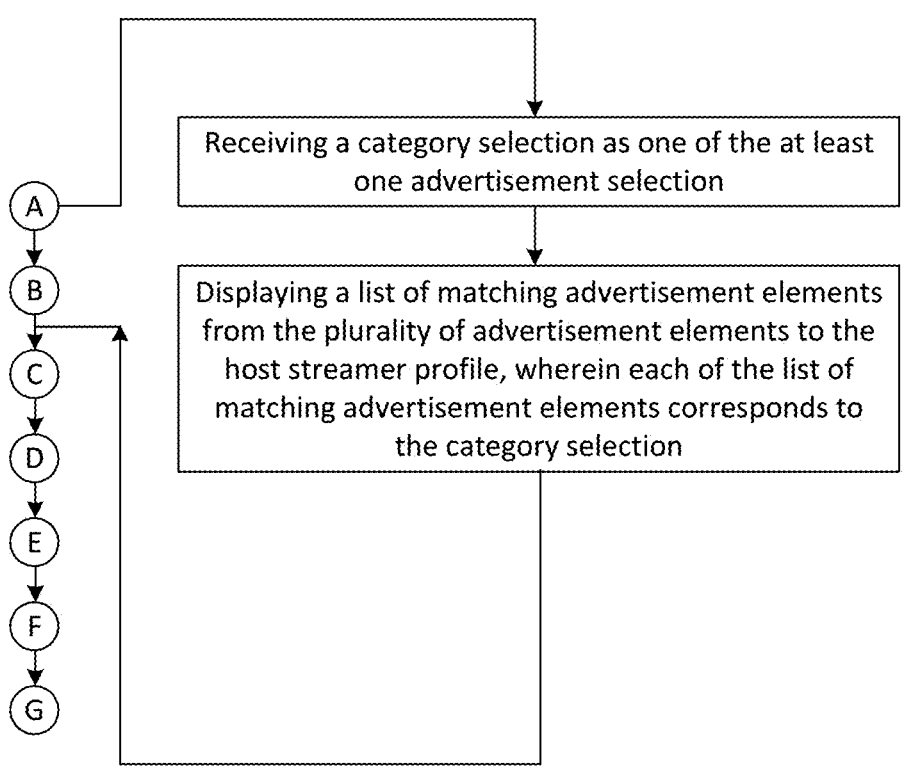
FIG. 5 is a stepwise flow diagram illustrating steps for allowing the streamer to choose an advertisement category in the method of the present invention.

In some embodiments, the category selection may be all that is needed to designate the at least one specific advertisement element to be displayed on the real-time video feed. In some other embodiments, after making the initial category selection, the streamer may further narrow which advertisement or advertisement type to display on their live stream by choosing from a list of categorized advertisement elements populated due to the category selection. Thus, an advertisement selection may be received with the host platform from the host streamer profile, wherein the advertisement selection corresponds to a specific advertisement element from the list of matching advertisement elements, as shown in FIG. 5. The specific advertisement element may then be designated as the at least one specific advertisement element with the host platform. An advertising element, event or notification can trigger digital overlays on movable or non-moveable surfaces through interactive continually verifiable points during real-time video feeds in reality, augmented reality, virtual reality, mixed reality, reality AI, and/or holographic reality.

Figure 6:
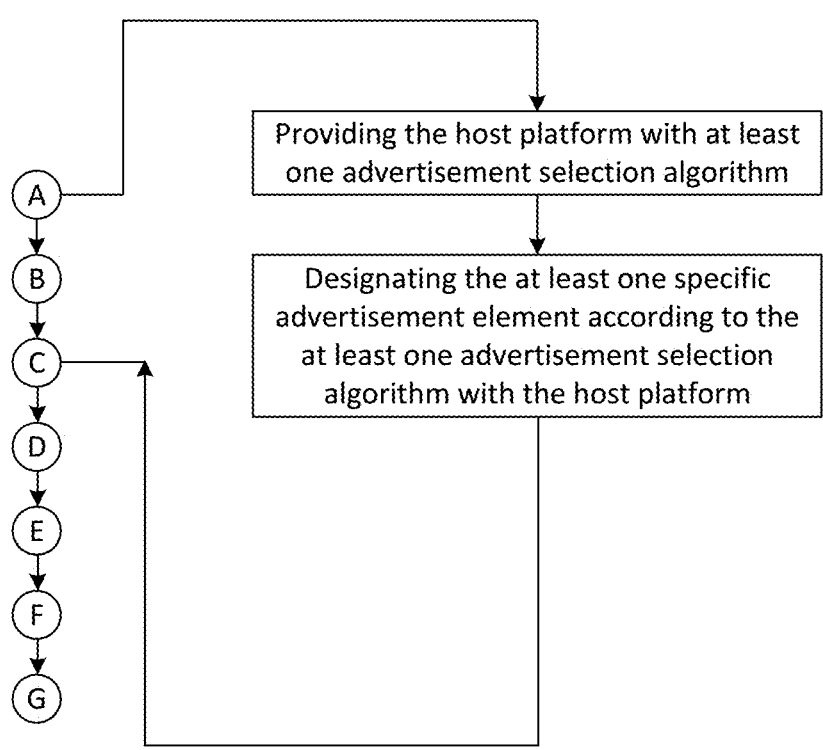
FIG. 6 is a stepwise flow diagram illustrating steps for using an advertisement selection algorithm to designate the at least one specific advertisement element in the method of the present invention.

In some embodiments, the host platform may be provided with at least one advertisement selection algorithm, as shown in FIG. 6. The at least one specific advertisement element is thus designated according to the at least one advertisement selection algorithm with the host platform. The at least one advertisement selection algorithm may vary as desired in different embodiments. In some embodiments, the at least one advertisement selection algorithm may comprise at least one artificial intelligence (AI) algorithm, which may take any suitable form of artificial intelligence algorithm. The at least one artificial intelligence algorithm may comprise one or more algorithms that may work in conjunction with each other in order to designate the at least one specific advertisement element based on any number of factors, which may be designated by the host platform and unchangeable, or the at least one artificial intelligence algorithm may take input from the host streamer profile, from the real-time video feed of the host streamer profile, from one of the at least one media platforms, or from another source. Further, the at least one media platform may include the plurality of third-party social media platforms.

Figure 7:
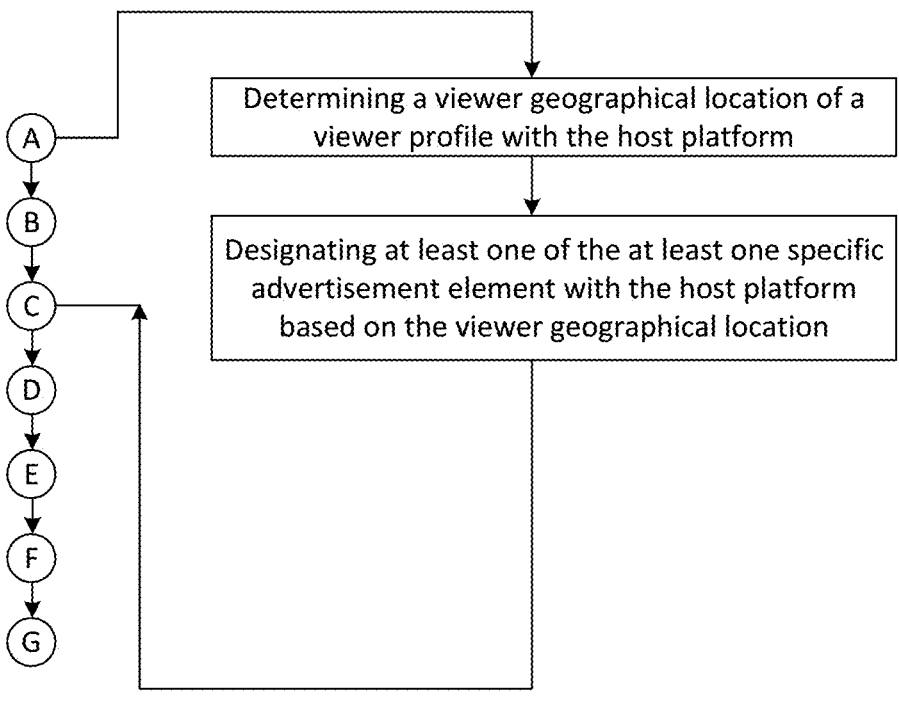
FIG. 7 is a stepwise flow diagram illustrating steps for using a viewer's geographical location to designate the at least one specific advertisement element in the method of the present invention.

In some embodiments, a viewer geographical location of a viewer profile may be determined with the host platform, as shown in FIG. 7. The determining of the viewer geographical location may be facilitated through any known and relevant means, such as, but not limited to, ordinary geofencing practices and processes known in the art, or new practices and processes. At least one of the at least one specific advertisement element may then be designated with the host platform based on the viewer geographical location.

Further, in some embodiments, at least one viewer attribute is provided, wherein the at least one viewer attribute is associated with a viewer profile managed by one of the at least one subordinate platform. As shown in FIG. 8, a targeted advertisement element may then be selected with the host platform as one of the at least one advertising element based on the at least one viewer attribute, and the targeted advertisement element is then displayed to the viewer profile on the real-time video feed as the at least one specific advertisement element.

Figure 9:
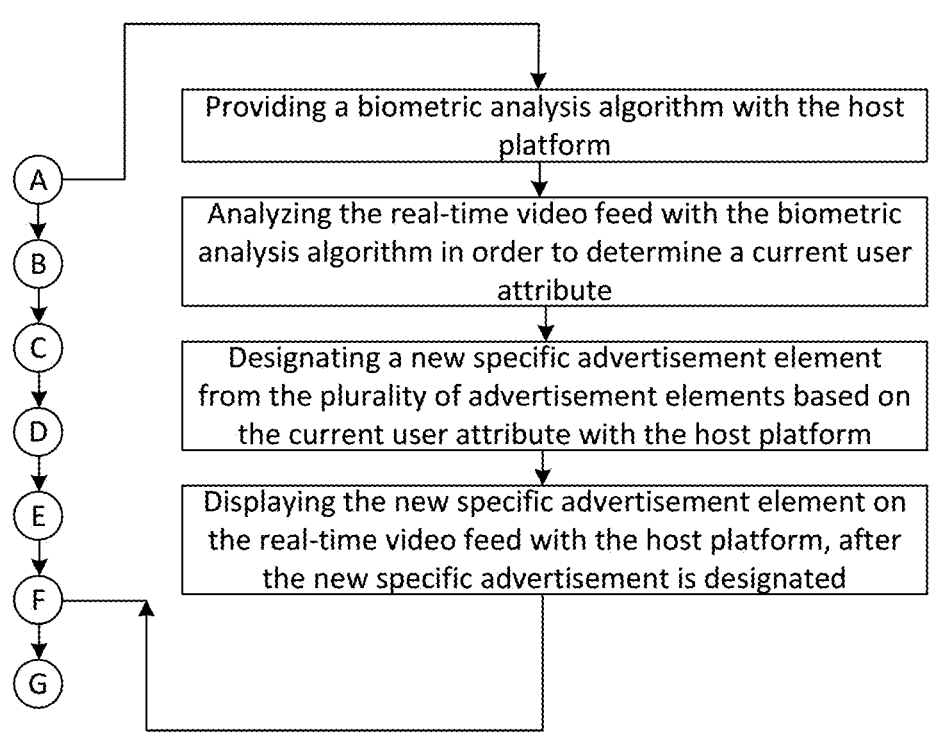
FIG. 9 is a stepwise flow diagram illustrating steps for using a biometric analysis algorithm to designate a new advertisement in the method of the present invention.

Further, in some embodiments, as shown in FIG. 9, a biometric analysis algorithm may be provided with the host platform. Further, the biometric analysis algorithm may include a biometric video analysis algorithm. In some embodiments, the biometric analysis algorithm may be provided as the at least one artificial intelligence algorithm, or the biometric analysis algorithm may be provided to supplement or operate separately from the at least one artificial intelligence algorithm. Biometric data may be collected using AI, machine learning, and/or deep learning to categorize personal advertisement placement or recommendations for the user. Personalized dynamically tailoring content, recommendations, or experiences to individual users based on their preferences, behaviors, and contextual data-instantly as they interact with a platform or system. This process uses a combination of data collection, analytics, and AI-driven decision-making to adapt and optimize the user's experience in real time. The real-time video feed may thus be analyzed with the biometric analysis algorithm in order to determine a current user attribute. The current user attribute may correspond to, for example, the user's current mood, wherein the biometric analysis algorithm may be configured to analyze human facial expressions with biometric video analysis and/or human speech patterns with biometric audio analysis and thereby determine a current mood of the live streamer. Other biometric aspects may further or alternatively be determined by the biometric analysis algorithm, such as, but not limited to, measurements of the streamer's body, in order to estimate a specific size of clothing to advertise to them, for example, or any other relevant biometric attributes. To customize ads, biometric sensors collect user data including heart rate, voice tone, and facial expressions. This real-time feedback loop keeps advertisements relevant and engaging, enhancing user engagement and conversion. For example, a user smiling at a product advertisement may trigger an instant discount offer, while a detected surge in pulse rate during contact may signify enthusiasm, promoting continued engagement.

Real-time analysis of biometric data such as facial expressions, heart rate, and voice tone to dynamically adapt the content of holographic advertisements to user emotions and preferences. Furthermore, in some embodiments, quantum computing for rapid biometric data analysis, ensuring real-time personalization of advertisements. Quantum sensors for ultra-precise environmental and biometric detection enable the system to adjust advertisements based on subtle user inputs or environmental conditions.

Biometric-triggered advertisement adjustments, such as changes in product suggestions or advertisement visuals based on detected user interest or disinterest. Extending biometric identification to incorporate physiological or emotional reactions to material for more customized experiences is the goal of advanced biometric feedback.

Interactive AR/VR Integration: Bringing AR and VR technology to the table to further immerse consumers, letting them go on completely virtual dates or attend virtual events.

The ability for NFTs to dynamically change over time in response to user activity, granting access to additional features, prizes, or capabilities Haptic feedback may be further used in conjunction with a holographic broadcast display of live or recorded content and advertisement. A Holographic Display System for devices capable of projecting 3D holographic advertisements that interact with users through gestures, voice commands, and other biometric inputs. Use of ultrasonic haptics (ultrahaptics) to provide tactile feedback, creating an immersive interaction between users and holographic content. Holographic advertisements can be projected in both virtual and physical environments using advanced holographic projectors. These systems allow for interactive 3D advertisements (advertisement element) that can be viewed from multiple angles and interacted with through hand gestures or speech.

The use of haptic feedback in the digital overlay system on real-time video feeds improves the user experience by adding another sensory dimension. When users engage with overlay components, such as adverts or scannable features, the system creates tactile sensations, such as vibrations, pulses, or ultrasonic textures. These haptic reactions align with the presented material, offering consumers prompt and instinctive feedback that enhances engagement and interaction. For example, when a user picks an item in an advertisement, a subtle vibration can validate the interaction, enhancing the immersive and responsive experience.

Ultrasonic haptics technology provides tactile feedback, allowing users to "feel" holographic objects as they interact with the advertisement. For instance, a user could feel the texture of a product being advertised, enhancing engagement and creating a memorable experience.

The technology integrates the synchronization of haptic responses across various devices to provide a uniform and cooperative experience across platforms. In a shared environment where numerous users interact with the same digital overlay—such as observing a holographic advertisement on a public screen—each user's device produces identical haptic feedback in response to the interaction. This synchronization is accomplished using exact timing standards and flexible feedback methods, guaranteeing that all users receive uniform tactile sensations irrespective of device kind or location. By facilitating further iterations.

Further, in some embodiments, a new specific advertisement element from the plurality of advertisement elements may be designated based on the current user attribute with the host platform, and the new specific advertisement element is subsequently displayed on the real-time video feed with the host platform, after the new specific advertisement is designated. Alternatively stated, in some embodiments the biometric analysis algorithm may detect changes in the user's mood or other attributes and correspondingly change what advertisement element is currently displayed on the real-time video feed as a result. Implementations may consist of biometrically recommended advertisements based on the streamer's emotion expressed during the live stream or recorded video such as, but not limited to, facial expressions, vocal level pattern or cadence, or other factors. Further, in some embodiments, the digital overlays and user involvement may be enhanced using biometric verification, NFT-based identities, haptic feedback, and holographic aspects to improve user interaction. Biometric authentication secures interest-based chatroom access. After verification, users are represented by dynamic NFT-based digital overlays that act as anonymous avatars, preserving privacy and customization.

These NFTs may be adjusted based on user choices, hobbies, or platform involvement to visually reflect and protect user privacy. By using NFTs to represent user identities, interactions remain anonymous while allowing for customization and social expression on the platform. The operational procedure starts with biometric verification, employing face recognition, fingerprint scanning, or alternative biometric methods to verify the user. This measure bolsters security by removing the necessity for conventional login credentials and guaranteeing that the user is distinctly authenticated for platform access.

Upon authentication, individuals are classified into interest-based chatrooms according to their stated preferences or interests. In these chatrooms, participants' identities are represented via NFTs that serve as dynamic digital overlays. These NFTs function as customized avatars, enabling users to preserve anonymity while conveying their identification through their digital assets.

Additionally, the system offers interactive functionalities like haptic feedback and holographic components. Users can perceive tactile sensations via haptic feedback when engaging with NFTs or digital overlays in their surroundings. For instance, interacting with a virtual item or digital advertisement may elicit a vibration or other physical feedback, enhancing immersion.

Furthermore, holographic components are included in the system, allowing the projection of digital overlays in three-dimensional space, hence enhancing immersive and engaging user experiences. This may encompass, for instance, the utilization of holograms for interactive virtual avatars or advertisements that users may engage with in real-time, hence augmenting engagement and immersion.

Improvements in Privacy, Security, and Engagement: The incorporation of biometric authentication guarantees secure verification of the user's identification, while the utilization of NFTs as digital overlays safeguards and personalizes user identities. The integration of these technologies cultivates a safe, anonymous environment for users, facilitating engaging and dynamic interactions.

The integration of haptic feedback and holographic components enhances the user experience by offering multimodal engagement, hence augmenting interaction with both the platform and the presented adverts. These innovative features augment the current framework while maintaining the original objective of improving user engagement in real-time video and interactive content environments.

Further, the devices used in the present invention may be configured for receiving and transmitting brainwave data and neural data. In embodiments involving these devices, digital content such as advertising content, surrounding content, and user feedback may be in the form of brainwave data or neural data. The present invention also allows for a learned AI system to download brainwave data, receive and record data for exchangeable consumption of memory, senses, reasoning, and other neural processes. Such embodiments may further comprise the release of substances into a duct or opening to a user's body.

Figure 10:
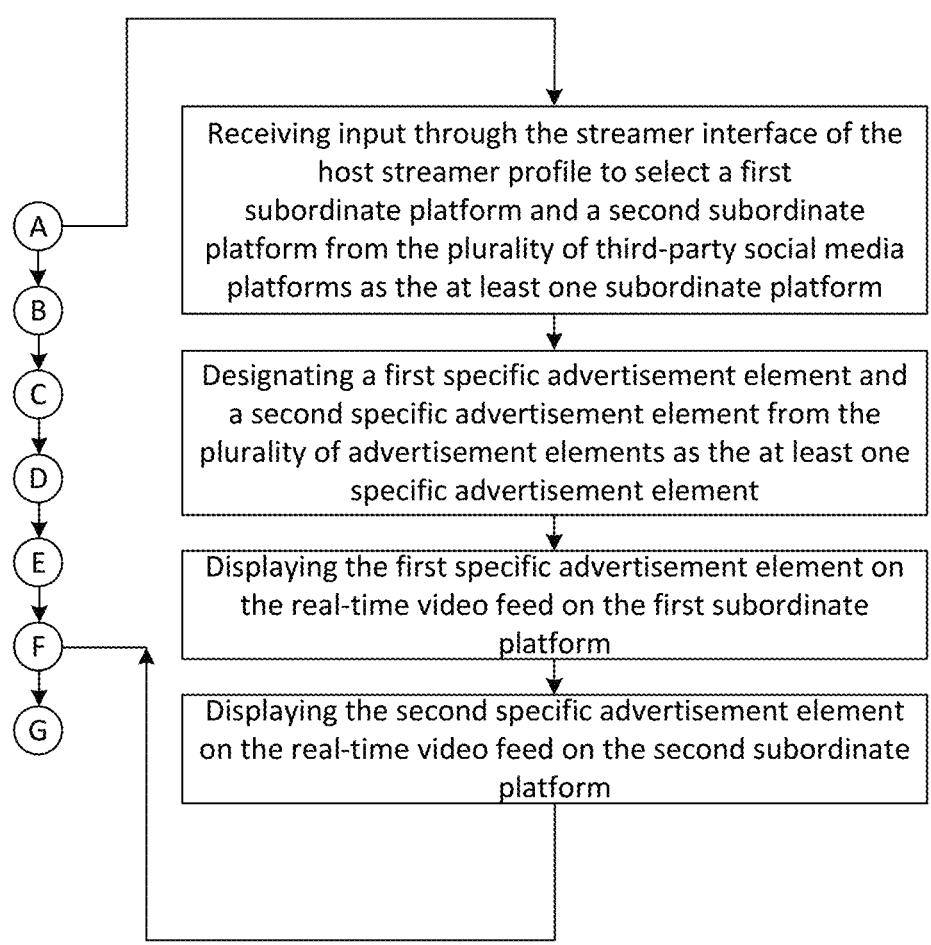
FIG. 10 is a stepwise flow diagram illustrating steps for displaying different advertisements on different platforms in the method of the present invention.

Further, in some embodiments, the present invention may display different advertisement elements on different platforms. To this end, as shown in FIG. 10, input may be received through the streamer interface of the host streamer profile to select a first subordinate platform and a second subordinate platform from the at least one media platform as the at least one subordinate platform. Further, the at least one media platform may include the plurality of third-party social media platforms. A first specific advertisement element and a second specific advertisement element are then designated from the plurality of advertisement elements as the at least one specific advertisement element. The first specific advertisement element is then displayed on the real-time video feed on the first subordinate platform, while the second specific advertisement element is simultaneously displayed on the real-time video feed on the second subordinate platform, wherein the underlying real-time video feed remains unchanged between the first subordinate platform and the second subordinate platform, but different advertisement elements are displayed on each subordinate platform. This may, for example, correspond to the aforementioned geofencing feature, such as a viewer or platform located in Italy may be shown an Italian-language advertisement element, while a viewer or platform located in Washington, D.C. may receive an English-language advertisement element.

Figure 11:
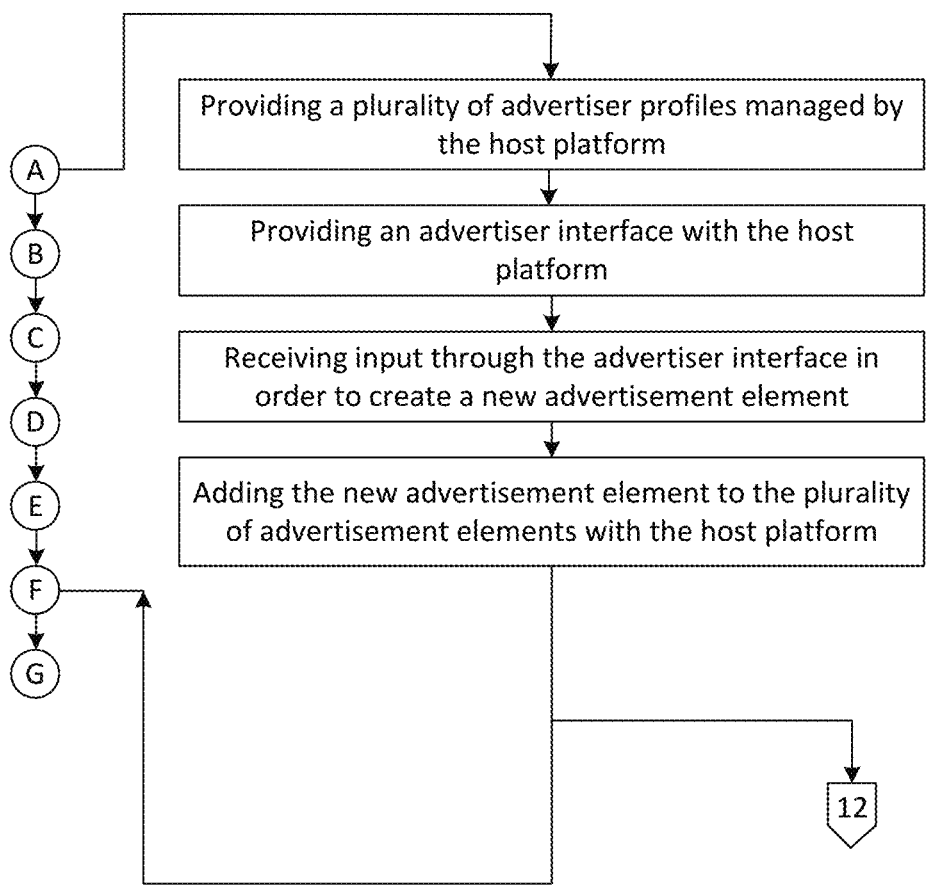
FIG. 11 is a stepwise flow diagram illustrating steps for an advertiser to create a new advertisement in the method of the present invention.

Further, in the preferred embodiment, entities who wish to have their advertisements displayed on video feeds through the present invention may interact with the host platform and general system of the present invention in order to initialize and customize their advertisements. To this end, a plurality of advertiser profiles is provided, wherein the plurality of advertiser profiles is managed by the host platform. Further, as shown in FIG. 11, an advertiser interface is provided with the host platform through which each of the plurality of advertiser profiles may interact with the host platform in order to set up and customize their desired advertisements. Thus, input may be received through the advertiser interface in order to create a new advertisement element, and the new advertisement element is subsequently added to the plurality of advertisement elements with the host platform, and the operation of the present invention may proceed as previously described.

Advertisers may have varying degrees of control and customization over their advertisements to be utilized with the present invention, as desired in various embodiments of the present invention.

Figure 12:
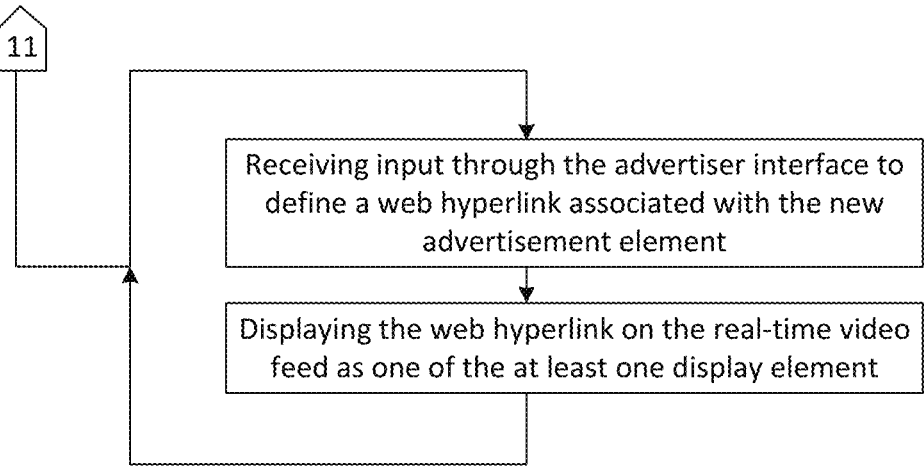
FIG. 12 is a stepwise flow diagram illustrating steps for displaying a web hyperlink on the real-time video feed in the method of the present invention.

In some embodiments, as shown in FIG. 12, input may be received through the advertiser interface to define a web hyperlink associated with the new advertisement element. The web hyperlink may be displayed on the real-time video feed as one of the at least one display element. A viewer may click on the web hyperlink in order to be taken directly to a product webpage, company webpage, subordinate platform, or other webpage through the web hyperlink, as designated by the associated advertiser profile. The present invention may further track the viewer's activity after engaging with the web hyperlink and may collect information about whether the user buys a product or not after viewing the advertisement and clicking the web hyperlink. This may be referred to as a sale conversion.

Finally, after the at least one specific advertisement element is designated and displayed on the real-time video feed in accordance with the foregoing disclosure, the at least one compensation amount may be distributed. The specific distribution scheme for the at least one compensation amount may vary as desired in different embodiments. For example, an advertiser may designate a three-way split for the compensation amount between the host platform, the streamer profile, and the at least one subordinate platform. Thus, the host platform, the streamer profile, and the at least one subordinate platform each has an incentive to participate in the operation of the present invention.

Figure 13:
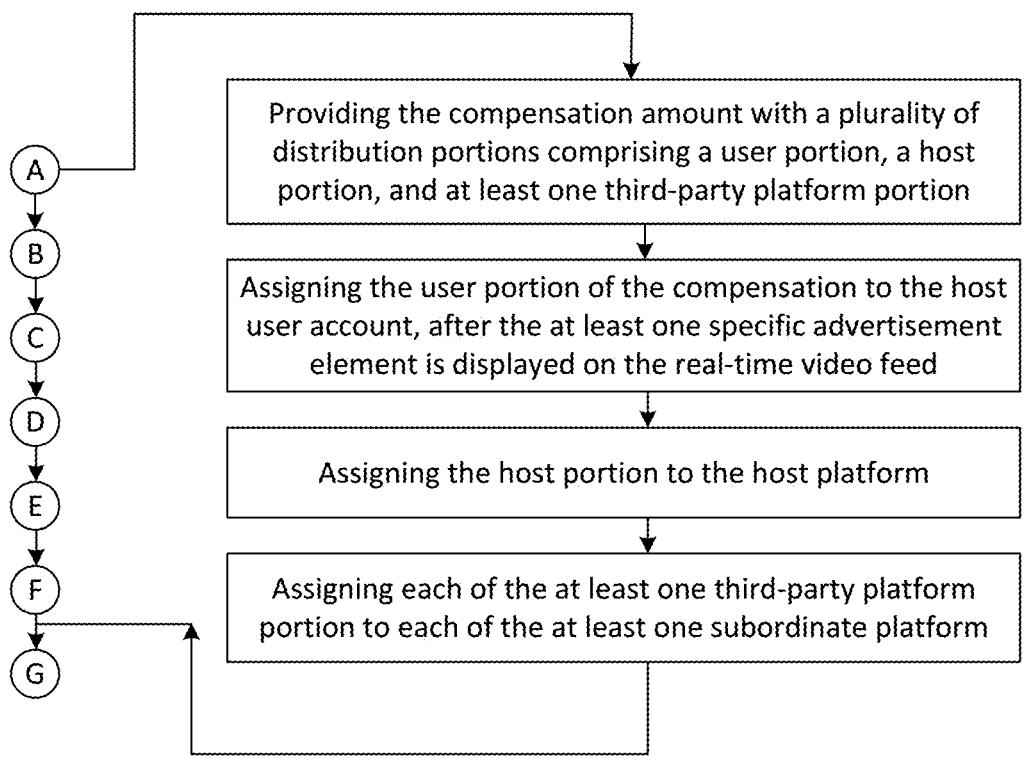
FIG. 13 is a stepwise flow diagram illustrating steps for distributing the compensation amount to various parties in the method of the present invention.

To this end, in some embodiments, the compensation amount may be provided with a plurality of distribution portions comprising a user portion, a host portion, and at least one third-party platform portion. As may be expected, as shown in FIG. 13, after the at least one specific advertisement element is displayed on the real-time video feed, the user portion of the compensation amount is assigned to the host streamer account, the host portion is assigned to the host platform, and each of the at least one third-party platform portion is assigned to each of the at least one subordinate platform. Further, the host streamer account may include a user account.

Further, in some embodiments, the at least one compensation amount may be in the form of transferrable tokens and keys associated with the transfer, sale, investment, or other transaction related to non-fungible tokens. In such embodiments, the step of distributing the at least one compensation amount further comprises the compensation amount being associated with a transferrable digital token and related data. The use of transferrable digital tokens with the present invention is not limited to the at least one compensation amount.

Furthermore, in the preferred embodiment of the present invention, the results of the various steps in the process of the present invention are recorded and stored in a blockchain as a smart contract. The blockchain may be any suitable blockchain, existing, new, or proprietary to the present invention. At each stage of the process of the present invention, various elements of the process, including, but not limited to, the selection of ads, the selection of a third-party platform, the distributed incentive, total number of impressions, and total number of actual sale conversion are recorded and stored in the blockchain as a smart contract.

In the preferred embodiment, advertisers can add their Focus Fast ads to a partnership program query list allowing users to earn incentives for picking advertisers and retailers products or services to be run during the user's live feed. After advertisers create an advertisement campaign, they can publish it to a social network for viewing and/or choose to add it to advertisement to Focus Fast partnership query list by categories pertaining to users' interests, mood, location, popularity, incentive opportunities, temperament, personality, disposition, creativity, and motivation but not limited to this. The Focus Fast system of the present invention allows better advertisement targeting that will separate advertisers, retailers, and media companies from their competition. It also creates a connection with customers and builds brand loyalty. Personalization marketing gives users control of who, what, when, and how advertisements are displayed in their live stream. This gives the viewers of the advertisements a visual presentation and an access link to the product and service. Further, the access link may include a product link.

The product link may be accessible to viewers who may have an interest in purchasing or learning more about the product or service. Integration of holographic QR codes or other scannable elements within advertisements, allowing users to interact with the advertisement to retrieve more information or complete transactions. Context-aware holographic content delivery, tailoring advertisements to the user's physical surroundings and AI algorithms to analyze real-time environmental data (e.g., lighting, crowd density) and adjust advertisements for maximum visibility and engagement.

Creators: Depending on the kind of material they're producing (serious vs. informal), creators might switch between identities using the fluid identity feature. While relative identity analytics would provide information on the kinds of material that are most popular, the self-hood notion would enable them to establish a closer connection with their followers. Further, the creators may include hosts, users, etc.

Users: Depending on the identity they are presently using, users might receive tailored content recommendations thanks to the fluid identity system. A personal identity would result in more social or entertainment-oriented recommendations, whereas a professional persona might draw recommendations based on career. Further, the users may include viewers.

Brands: Using both relative and absolute identification models to target people might be advantageous for brands. Using data from social clustering, they might target areas where their goods are more likely to be popular or verified consumers with targeted adverts or content.

Incentive (compensation amount) is given to the host streamer profile if they run ads, if their total viewers' market reach is exceeding, or if a sale conversion is initiated through the host user profile's real-time video feed. Each stage of the process from the selection of ads, the selection of a third-party platform, the distributed incentive, total number of impressions, and the total number of actual sale conversions is recorded and stored in a blockchain as a smart contract. In some embodiments, blockchain may be encrypted using Symmetric Encryption, Asymmetric Encryption, Hashing, and Quantum encryption for secure exchange of biometric data and other sensitive information between devices and platforms. Users can give Focus Fast Ads access to their live stream in order to allow automated advertisements, or the user of the host streamer profile can block advertisements by activating relevant user control functions. Cross social network marketing allows users to run advertisements on different social platforms. Before a live stream a user can select an advertisement, or an advertisement is selected for them and placed based on collected user data.

The user can add participating social networks to their live broadcast to allow cross social platform advertising. Higher advertisement impressions and conversions are achieved when the advertisement is spread to multiple platforms. Focus Fast cross platform marketing extends advertisers' reach to customers with relevant and useful advertisements more than traditional in-house platforms. This system helps give advertiser insights into how effective their advertisement campaign is for their product or service. Focus Fast ad artificial intelligence, machine learning algorithms, data science, and deep learning create performance analytic reports that track, measure, and forecast ads' performance, giving easy access to key metrics of marketing data such as total clicks, conversion rate, cost per conversion, impressions, cost per impression, but not limited to this. Live streamers also have access to their advertisement placement performance such click through rate (CTR), and revenue earn per mile (RPM), helping users optimize the advertising they place on their live stream. The user can see which advertisements are earning them the most money and which are not.

FIG. 14 is a flowchart of a method 1400 of multi-platform social media advertising via digital overlays on real-time video feeds, in accordance with some embodiments. Accordingly, the method 1400 may include a step 1402 of providing a host platform. Further, the host platform manages at least one advertisement element. Further, the host platform uses at least one processing unit to execute computer-executable instructions stored on a non-transitory computer-readable medium. Further, the at least one advertisement element is associated with at least one display element, at least one audio element, and at least one haptic element.

Further, the method 1400 may include a step 1404 of providing a plurality of third-party social media platforms.

Further, the method 1400 may include a step 1406 of providing a host streamer profile managed by the host platform. Further, the host streamer profile may be associated with a streamer interface.

Further, the method 1400 may include a step 1408 of receiving at least one advertisement selection with the host platform from the host streamer profile.

Further, the method 1400 may include a step 1410 of designating at least one specific advertisement element from a plurality of advertisement elements based on the at least one advertisement selection.

Further, the method 1400 may include a step A 1412 of receiving input through the streamer interface of the host streamer profile to select at least one subordinate platform from the plurality of third-party social media platforms.

Further, the method 1400 may include a step B 1414 of initializing a real-time video feed associated with the host streamer profile on the host platform.

Further, the method 1400 may include a step C 1416 of simultaneously broadcasting the real-time video feed to each of the at least one subordinate platform. Further, the broadcasting of the real-time video feed may include multicasting, simulcasting, geo-casting, recasting, etc.

Further, the method 1400 may include a step D 1418 of outputting, by the host platform, the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection, and the designating of the at least one specific advertisement element may be sequentially performed at least one of before and during the simultaneously broadcasting of the real-time video feed. Further, the sequentially performing of the receiving of the at least one advertisement selection, and the designating of the at least one specific advertisement element may include sequentially executing of the receiving of the at least one advertisement selection, and the designating of the at least one specific advertisement element. Further, at least one of the real-time video feed and the at least one specific advertisement element may be a streaming media. Further, in an embodiment, steps (A) through (D) are sequentially executed. Further, the at least one specific advertisement element outputted on the real-time video feed, may be presented using a holographic display system. Further, the at least one specific advertisement element may include at least one holographic advertisement. Further, the at least one holographic advertisement may be projected in at least one of a virtual environment and a physical environment using one or more advanced holographic projectors of the holographic display system. Further, the at least one holographic advertisement be an interactive 3D advertisement element. Further, the holographic display system allows viewing the interactive 3D advertisement from multiple angles and interacting with the interactive 3D advertisement through one or more of hand gestures and speech of at least one of the plurality of users. Further, the holographic display system may employ ultrasonic haptics technology. Further, the holographic display system by employing the ultrasonic haptics technology provides tactile feedback, allowing at least one of the plurality of users to "feel" holographic objects comprised in the at least one advertisement element as at least one of the plurality of users interacts with the at least one specific advertisement element. For instance, a user could feel the texture of a product being advertised, enhancing engagement and creating a memorable experience. Further, the outputting of the at least one specific advertisement element on the real-time video feed may include simultaneously delivering the at least one specific advertisement element on the real-time video feed to a plurality of users on each of the at least one subordinate platform comprised of a plurality of platforms by employing quantum-enhanced cloud computing. Further, the quantum-enhanced cloud computing lever- ages quantum parallelism for encrusting real-time respon- siveness and scalability for the simultaneously delivering of the at least one specific advertisement element.

Further, in some embodiments, the at least one specific advertisement element may be comprised of a plurality of contents. Further, the plurality of contents may be dynami- cally adjusted or customized. Further, the presenting of the at least one specific advertisement element may include presenting at least one of the plurality of contents based on at least one of an adjustment and a customization. Further, the at least one specific advertisement element may be associated with at least one characteristic. Further, the at least one characteristic may be dynamically adjusted or customized. Further, the at least one characteristic may include a brightness, a sound, an animation, a size, a haptic feedback, etc. Further, the at least one characteristic may correspond to at least one of the at least one display element, the at least one audio element, and the at least one haptic element. Further, the presenting of the at least one specific advertisement element as the overlay on the real-time video feed and the real-time video feed may include making the the at least one specific advertisement element viewable, audible, perceivable, feelable, etc. Further, the presenting of the at least one specific advertisement element as the overlay on the real-time video feed and the real-time video feed may include making the the at least one specific advertisement element sensable through a plurality of sensing channels. Further, the pluraliting of sensing channels may include seeing, hearing, touching, tasting, smelling, etc.

Further, in some embodiments, the at least one specific advertisement element may be characterized by at least one of a presentation characteristic and a duration. Further, the presentation characteristic may include at least one of a position, an orientation, a location, and a movement of the at least one specific advertisement element in relation to a frame of the real-time video feed. Further, the presentation characteristic may include a location, such as, but not limited to, a bottom, top, left, right, or center of a screen presenting the real-time video feed.

In further embodiments, the method 1400 of multi-plat- form social media advertising via digital overlays on real- time video feeds may include a step of determining at least one of a specific presentation characteristic and a specific duration for the at least one specific advertisement element in relation to the real-time video feed. Further, the outputting of the at least one specific advertisement element may be based on the determining of at least one of the specific presentation characteristic and the specific duration. Further, the at least one specific advertisement element may be outputted as the overlay with at least one of the specific presentation characteristic and the specific duration on the real-time video feed.

Further, in some embodiments, the real-time video feed and the at least one specific advertisement element as the overlay on the real-time video feed may be presented using at least one of a plurality of devices associated with the at least one subordinate platform based on the simultaneously broadcasting and the outputting. Further, the plurality of devices may include an advertisement device, a computing device, a wearable device, an extended reality device, a user device, a digital device, etc. Further, the plurality of devices may be used for interacting with the at least one subordinate platform. Further, the plurality of devices employs one or more quantum communication protocols. Further, the plu- rality of devices employing the one or more quantum communication protocols may be configured for synchronizing the presenting of the at least one specific advertise- ment element as the overlay on the real-time video feed. Further, the synchronizing of the presenting of the at least one specific advertisement element enables presenting of an identical content in real-time by the plurality of devices.

Further, in an embodiment, at least one of the plurality of devices may include at least one holographic display device. Further, the at least one holographic display device may include a holographic projector. Further, the at least one holographic display device may include an advertisement device, a holographic display system, etc. Further, the at least one specific advertisement element may include at least one holographic element. Further, the at least one holo- graphic element may include a holographic imagery, a holographic representation, a hologram, a holographic object, a holographic component, a holographic image, etc. Further, the at least one holographic element may include at least one holographic content, at least one holographic advertisement, etc. Further, the presenting of the at least one specific advertisement element as the overlay on the real- time video feed may include displaying the at least one holographic element as the overlay on the real-time video feed. Further, in an embodiment, the at least one holographic display device may include one or more digital overhead holographic display devices. Further, the one or more digital overhead holographic display devices may be used to gen- erate one or more holographic images. Further, the at least one specific advertisement element may be comprised of the one or more holographic images. For example, one or more devices (such as the at least one holographic display device) located on a street that displays a digital holographic image of a city's speed limit. When a person drives towards the image, they will see the hologram display of the city's speed limit or an Advertisement of local restaurant logo and/or commercial as a digital overlay.

Further, in an embodiment, the at least one holographic element may tactually be at least one of senses and interacts with at least one of an individual and an object using a reversed haptic technology. Further, the reversed haptic technology may be employed using at least one device (such as LIDAR sensors, ultrasonic waves emitter, sound waves generator, air pressure generator, etc.) and at least one programmable smart material. Further, the at least one device may include an advertisement device, Further, the individual may be a person, a human, a user, etc. Further, the object may include an item, an article, etc.

Further, in an embodiment, the at least one holographic element may tactually be at least one of interacted and sensed by at least one of the individual and the object. Further, the tactually at least one of the interacting and the sensing by at least one of the individual and the object may be based on the reversed haptic technology and a haptic technology. Further, the haptic technology may include an ultrasonic haptic technology. Further, at least one of the reversed haptic technology and the haptic technology may be employed by the at least one device. Further, the at least one device may include an advertisement device. Further, at least one of the plurality of devices may employ an ultra- sonic haptics technology. Further, at least one of the plurality of devices employing the ultrasonic haptics technology may be configured for providing a tactile feedback to at least one of the plurality of users, allowing at least one of the plurality of users to "feel" one or more holographic objects comprised in the at least one specific advertisement element as at least one of the plurality of users interact with the at least one specific advertisement element. For instance, a user could feel the texture of a product being advertised, enhancing engagement and creating a memorable experience. Further, at least one of the plurality of devices may include a holographic display system with ultrahaptics.

Further, in an embodiment, at least one of the plurality of devices may include at least one extended reality device. Further, the presenting of the at least one specific advertisement element as the overlay on the real-time video feed may include presenting the at least one specific advertisement element as the overlay on the real-time video feed in at least one extended reality environment. Further, the at least one extended reality environment may include a virtual reality environment, an augmented reality environment, a mixed reality environment, an extended reality environment, etc.

FIG. 15 is a flowchart of a method 1500 of multi-platform social media advertising via digital overlays on real-time video feeds, in accordance with some embodiments. Accordingly, the method 1500 may include a step 1502 of determining a geographical location of a user profile managed by at least one of the at least one subordinate platform, with the host platform. Further, the geographic location may location of a user associated with the user profile. Further, the user may be a viewer. Further, the determining of the geolocation may be based on a data from a geolocation sensor, a contextual data associated with the user profile, etc.

Further, the method 1500 may include a step 1504 of determining a specific language associated with the geographical location. Further, the specific language may include a natural language such as English, Hindi, Cantonese, French, Italian, Spanish, etc.

Further, the method 1500 may include a step 1506 of translating the at least one specific advertisement element to the specific language based on the determining of the specific language. Further, the outputting of the at least one specific advertisement element as the overlay on the real-time video feed may include outputting the at least one specific advertisement element in the specific language on the real-time video feed.

FIG. 16 is a flowchart of a method 1600 of multi-platform social media advertising via digital overlays on real-time video feeds, in accordance with some embodiments. Accordingly, the method 1600 may include a step 1602 of obtaining at least one information associated with a user profile managed by at least one of the at least one subordinate platform, with the host platform. Further, the at least one information may be of at least one activity associated with the user profile. Further, the at least one activity may include a social media activity, a purchasing activity, a media viewing activity, etc.

Further, the method 1600 may include a step 1604 of analyzing the at least one information using at least one algorithm. Further, the at least one algorithm may include a machine learning algorithm, an artificial intelligence algorithm, an analytic algorithm, etc.

Further, the method 1600 may include a step 1606 of generating at least one insight about a user associated with the user profile based on the analyzing of the at least one information. Further, the at least one insight may include a media viewing pattern, a geographic location, a demographic, a purchasing pattern, etc.

Further, the method 1600 may include a step 1608 of providing the at least one insight to at least one of a plurality of first users. Further, the plurality of first users may include advertisers, etc. Further, the providing of the at least one insight may include transmitting the at least one insight to at least one first device associated with at least one of the plurality of first users. Further, the at least one first user may include a computing device, a user device, a digital device, etc.

FIG. 17 is a flowchart of a method 1700 of multi-platform social media advertising via digital overlays on real-time video feeds, in accordance with some embodiments. Accordingly, the method 1700 may include a step 1702 of detecting an interaction of a user using a first device of the plurality of devices. Further, the plurality of devices may include computing devices, user devices, digital devices, etc. Further, the interaction may be for engagement with the at least one specific advertisement element. Further, the interaction may be associated with the at least one specific advertisement element. Further, the first device may be associated with the at least one subordinate platform.

Further, the method 1700 may include a step 1704 of generating a haptic response in reaction to the interaction, through the first device based on the interaction and the at least one specific advertisement element. Further, the haptic response may include a haptic reaction, a haptic sensation, a tactile sensation, a haptic feedback, etc.

FIG. 18 is a flowchart of a method 1800 of multi-platform social media advertising via digital overlays on real-time video feeds, in accordance with some embodiments. Accordingly, the method 1800 may include a step 1802 of detecting a plurality of interactions of a plurality of users using a plurality of second devices of the plurality of devices. Further, the plurality of interactions may be associated with the at least one specific advertisement element. Further, the plurality of second devices may be associated with the at least one subordinate platform. Further, the plurality of second devices may be in a shared environment. Further, the shared environment implies at least one of the plurality of second devices and the plurality of users shares an environment. Further, the environment may include a physical environment, an extended reality environment, etc. Further, the environment may include a communication environment, a network environment, etc.

Further, the method 1800 may include a step 1804 of generating a haptic response in reaction to the plurality of interactions, uniformly through the plurality of second devices based on the plurality of interactions and the at least one specific advertisement element.

FIG. 19 is a flowchart of a method 1900 of multi-platform social media advertising via digital overlays on real-time video feeds, in accordance with some embodiments. Accordingly, the method 1900 may include a step 1902 of detecting at least one factor associated with a color shifting during the presenting of the real-time video feed and the at least one specific advertisement element as the overlay on the real-time video, using at least one of the plurality of devices. Further, the at least one factor corresponds to a display environment of at least one of the plurality of devices. Further, the at least one factor may be detected using at least one sensor. Further, the at least one sensor may include an environment sensor, a device sensor, a display sensor, etc., comprised and/or associated with at least one of the plurality of devices. Further, the at least one factor may include viewing angle, lighting conditions, subpixel misalignment, etc. Further, at least one of the plurality of devices may include a display screen (such as OLED screen, LCD screen, LED screen, QNED screen, QLED screen, etc.), a holographic projector, etc.

Further, the method 1900 may include a step 1904 of generating at least one factor data based on the detecting of the at least one factor.

Further, the method 1900 may include a step 1906 of analyzing the at least one factor data using at least one algorithm. Further, the at least one algorithm may include a machine learning algorithm, an artificial intelligence algorithm, an adaptive algorithm, etc.

Further, the method 1900 may include a step 1908 of receiving a selection of a perfect or an imperfect in relation to pixels in an image associated with at least one of the real-time video feed and the at least one specific advertisement element from the color shifting by a user.

Further, the method 1900 may include a step 1910 of detecting an instance of the color shifting associated with the presenting of the real-time video feed and the at least one specific advertisement element as the overlay on the real-time video, using at least one of the plurality of devices, based on the analyzing of the at least one factor data and the selection.

Further, the method 1900 may include a step 1912 of dynamically correcting a color inconsistency associated with the presenting of the real-time video feed and the at least one specific advertisement element as the overlay on the real-time video, using at least one of the plurality of devices, based on the detecting of the instance of the color shifting. Further, the dynamically correction may be performed in at least one of the plurality of devices.

FIG. 20 is a flowchart of a method 2000 of multi-platform social media advertising via digital overlays on real-time video feeds, in accordance with some embodiments. Accordingly, the method 2000 may include a step 2002 of generating an environmental data of an environment of at least one of a plurality of users by detecting an environmental condition of the environment using at least one of a plurality of devices. Further, the environmental condition may include an ambient light, a crowd density, etc. Further, at least one of the plurality devices may include an environment sensor such as a lighting sensor, an imaging sensor, etc. Further, at least one of the plurality of devices may include at least one quantum sensor. Further, the environmental condition may include a real time environmental condition. Further, the detecting of the environmental condition may include detecting the environmental condition in real time.

Further, the method 2000 may include a step 2004 of analyzing the environmental data. Further, the analyzing of the environmental data may include analyzing the environmental data using a quantum computing device employing quantum computing, quantum processing, etc. Further, the quantum computing accelerates the processing of the environmental data, enabling delivering of the at least one specific advertisement element in real time. Further, the at least one specific advertisement element may be a personalized holographic content. Further, the analyzing of the environmental data may include analyzing the environmental data using one or more AI algorithms.

Further, the method 2000 may include a step 2006 of determining at least one customization to the at least one specific advertisement element outputted as the overlay on the real-time video feed based on the analyzing of the environmental data. Further, the at least one customization may be associated with a brightness, a size, a content, etc., of the at least one specific advertisement element.

Further, the method 2000 may include a step 2008 of customizing the at least one specific advertisement element outputted as the overlay on the real-time video feed based on the at least one customization. Further, the customizing of the at least one specific advertisement element may include adjusting the brightness, the size, the content, etc., of the at least one specific advertisement element. Further, the customizing of the at least one specific advertisement element adjusting the brightness, size, or content of the at least one specific advertisement element based on ambient light or crowd density to maximize visibility and relevance. Further, the customizing of the at least one specific advertisement element may perform context-aware holographic content delivery by tailoring the at least one specific advertisement element to a physical surrounding of at least one of a plurality of users.

FIG. 21 is a flowchart of a method 2100 of multi-platform social media advertising via digital overlays on real-time video feeds, in accordance with some embodiments. Accordingly, the method 2100 may include a step 2102 of generating a user data of at least one of a plurality of users by detecting a user state of the user using at least one of a plurality of devices. Further, the user state may include a physical state (such as a movement, a gesture, a motion, a location, etc.), a physiological state (such as a heartbeat rate, a breathing rate, a blood pressure, a body temperature, etc.) an emotional state (such as a facial expression, an eye movement, a pupil dilation, an eye movement, a voice tone, etc.), etc. of the user. Further, at least one of the plurality of devices may include a physical state sensor, a physiological state sensor, an emotional state sensor, etc. Further, the physical state, the physiological state, the emotional state, etc. corresponds to a response and a reaction of at least one of the plurality of users consuming and/or interacting with the at least one specific advertisement element. Further, the generating of the user data may be based on one or more biometric sensors. Further, the one or more biometric sensors capture user-specific data, such as facial microexpressions, heart rate, and voice pitch of at least one of the plurality of users. Further, the one or more biometric sensors may include one or more quantum sensors. Further, the one or more quantum sensors provide ultra-sensitive detection capabilities, such as identifying microexpressions or subtle voice modulations. Further, the one or more quantum sensors enhance the precision of biometric data analysis, ensuring that advertisements respond accurately to a user input. Further, the user input corresponds to the user state, the user response, the user reaction, etc. Further, the user data may be encryptingly generated by employing quantum encryption. Further, the employing of the quantum encryption may include using one or more quantum encryption methods for encrypting the user data.

Further, the method 2100 may include a step 2104 of analyzing the user data. Further, the analyzing of the user data determines a preference, an emotion, an interest, etc. of the user. Further, the analyzing of the user data may include analyzing the user data using a quantum computing device employing quantum computing, quantum processing, etc. Further, the quantum computing accelerates the processing of the user data, enabling delivering of the at least one specific advertisement element in real time. Further, the at least one specific advertisement element may be a personalized holographic content.

Further, the method 2100 may include a step 2106 of determining at least one customization to the at least one specific advertisement element outputted as the overlay on the real-time video feed based on the analyzing of the user data.

Further, the method 2100 may include a step 2108 of customizing the at least one specific advertisement element outputted as the overlay on the real-time video feed based on the at least one customization. Further, the customizing may include tailoring the at least one specific advertisement element dynamically. Further, the tailoring of the at least one specific advertisement element may be performed in a real time feedback loop based on a continuous generation of the user data. Further, the real-time feedback loop ensures that the at least one specific advertisement element remains relevant and engaging, increasing the likelihood of user interaction and conversion.

FIG. 22 is a flowchart of a method 2200 of multi-platform social media advertising via digital overlays on real-time video feeds, in accordance with some embodiments. Accordingly, the method 2200 may include a step 2202 of initiating a biometric verification of a user. Further, the initiating of the biometric verification may include initiating a biometric verification session for the biometric verification of the user.

Further, the method 2200 may include a step 2204 of collecting one or more biometrics of the user based on the initiating. Further, the one or more biometrics may be collected using one or more biometric sensors. Further, the one or more biometrics may include a heart rate, a voice tone, a facial expression, etc. of the user. Further, the collecting of the one or more biometrics may include receiving the one or more biometrics from the one or more biometric sensors. Further, the one or more biometrics generated by the one or more biometric sensors may be encrypted by employing quantum encryption. Further, the employing of the quantum encryption includes using one or more quantum encryption methods for encrypting the one or more biometrics. Further, the one or more biometrics may be received after the encryption of the one or more biometrics by employing the quantum encryption.

Further, the method 2200 may include a step 2206 of verifying the user based on the one or more biometrics.

Further, the method 2200 may include a step 2208 of creating a digital overlay representing an identity of the user in at least one of a physical environment and an extended reality environment based on the verifying of the user. Further, the digital overlay may be based on a nonfungible token. Further, the real-time video feed and the at least one specific advertisement element outputted as the overlay on the real-time video feed may be presented in at least one of the physical environment and the extended reality environment. Further, the digital overlay allows the user to interact with the at least one specific advertisement element outputted as the overlay on the real-time video feed, presented in at least one of the physical environment and the extended reality environment. Further, the digital overlay may include an advatar of the user. Further, the advatar may be in an image of the user. Further, the advatar may be an advertisement of user. Further, the at least one specific advertisement may include the advatar. Further, the advatar may be created using one or more advertisement devices. Further, the advatar may be a holographic imagery with haptics. Further, the advatar may perform one or more tasks based on a dense nature of increased pressure of air, sound, etc., associated with the advatar, and created using the one or more advertisement devices.

FIG. 23 is a flowchart of a method 2300 of multi-platform social media advertising via digital overlays on real-time video feeds, in accordance with some embodiments. Accordingly, the method 2300 may include a step 2302 of receiving a user data of the user based on the verifying of the user.

Further, the method 2300 may include a step 2304 of analyzing the user data.

Further, the method 2300 may include a step 2306 of determining at least one of a preference and an interest of the user based on the analyzing of the user data.

Further, the method 2300 may include a step 2308 of selecting a virtual environment from a plurality of virtual environments for the user based on at least one of the preference and the interest. Further, the virtual environment may include a chatroom. Further, the virtual environment aligns with at least one of the preference and the interest of the user. Further, the real-time video feed and the at least one specific advertisement element outputted as the overlay on the real-time video feed may be presented in the virtual environment based on the selecting.

Figure 24:
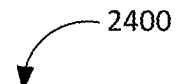
FIG. 24 is a flowchart of a method 2400 of multi-platform social media advertising via digital overlays on real-time video feeds, in accordance with some embodiments.

FIG. 24 is a flowchart of a method 2400 of multi-platform social media advertising via digital overlays on real-time video feeds, in accordance with some embodiments. Accordingly, the method 2400 may include a step 2402 of detecting an interaction of the user performed through the digital overlay, using a device. Further, the interaction may be associated with one or more elements comprised in the at least one specific advertisement element. Further, the interaction may be associated with at least one of the at least one specific advertisement element and one or more digital overlays. Further, the one or more elements may include one or more scannable elements. Further, the one or more elements may include dynamic QR codes, interactive hotspots, etc.

Further, the method 2400 may include a step 2404 of enabling a performance of one or more actions, through the device based on the interaction. Further, the enabling of the performance of the one or more actions may include performing of the one or more actions. Further, the one or more actions may include retrieving detailed information, completing transactions, sharing content, generating a haptic response in reaction to the interaction, etc. Further, the one or more actions may include a device-to-device interaction. Further, the device to device interaction may include allowing multiple users to collaboratively engage with the at least one specific advertisement element and/or share information between the device and at least one device securely.

FIG. 25 is a flowchart of a method 2500 of multi-platform social media advertising via digital overlays on real-time video feeds, in accordance with some embodiments. Accordingly, the method 2500 may include a step 2502 of providing a host platform. Further, the host platform manages at least one advertisement element. Further, the host platform uses at least one processing unit to execute computer-executable instructions stored on a non-transitory computer-readable medium.

Further, the method 2500 may include a step 2504 of providing a plurality of third-party social media platforms.

Further, the method 2500 may include a step 2506 of providing a host streamer profile managed by the host platform. Further, the host streamer profile may be associated with a streamer interface.

Further, the method 2500 may include a step 2508 of receiving at least one advertisement selection with the host platform from the host streamer profile.

Further, the method 2500 may include a step 2510 of designating at least one specific advertisement element from a plurality of advertisement elements based on the at least one advertisement selection.

Further, the method 2500 may include a step A 2512 of receiving input through the streamer interface of the host streamer profile to select at least one subordinate platform from the plurality of third-party social media platforms.

Further, the method 2500 may include a step B 2514 of initializing a real-time video feed associated with the host streamer profile on the host platform.

Further, the method 2500 may include a step C 2516 of simultaneously broadcasting the real-time video feed to each of the at least one subordinate platform.

Further, the method 2500 may include a step D 2518 of outputting, by the host platform, the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection, and the designating of the at least one specific advertisement element may be sequentially performed at least one of before and during the simultaneously broadcasting of the real-time video feed.

Further, the method 2500 may include a step 2520 of determining a geographical location of a user profile managed by at least one of the at least one subordinate platform, with the host platform.

Further, the method 2500 may include a step 2522 of determining a specific language associated with the geographical location.

Further, the method 2500 may include a step 2524 of translating the at least one specific advertisement element to the specific language based on the determining of the specific language. Further, the outputting of the at least one specific advertisement element as the overlay on the real-time video feed may include outputting the at least one specific advertisement element in the specific language on the real-time video feed. Further, at least one of the real-time video feed and the at least one specific advertisement element may be a streaming media.

Figure 26:
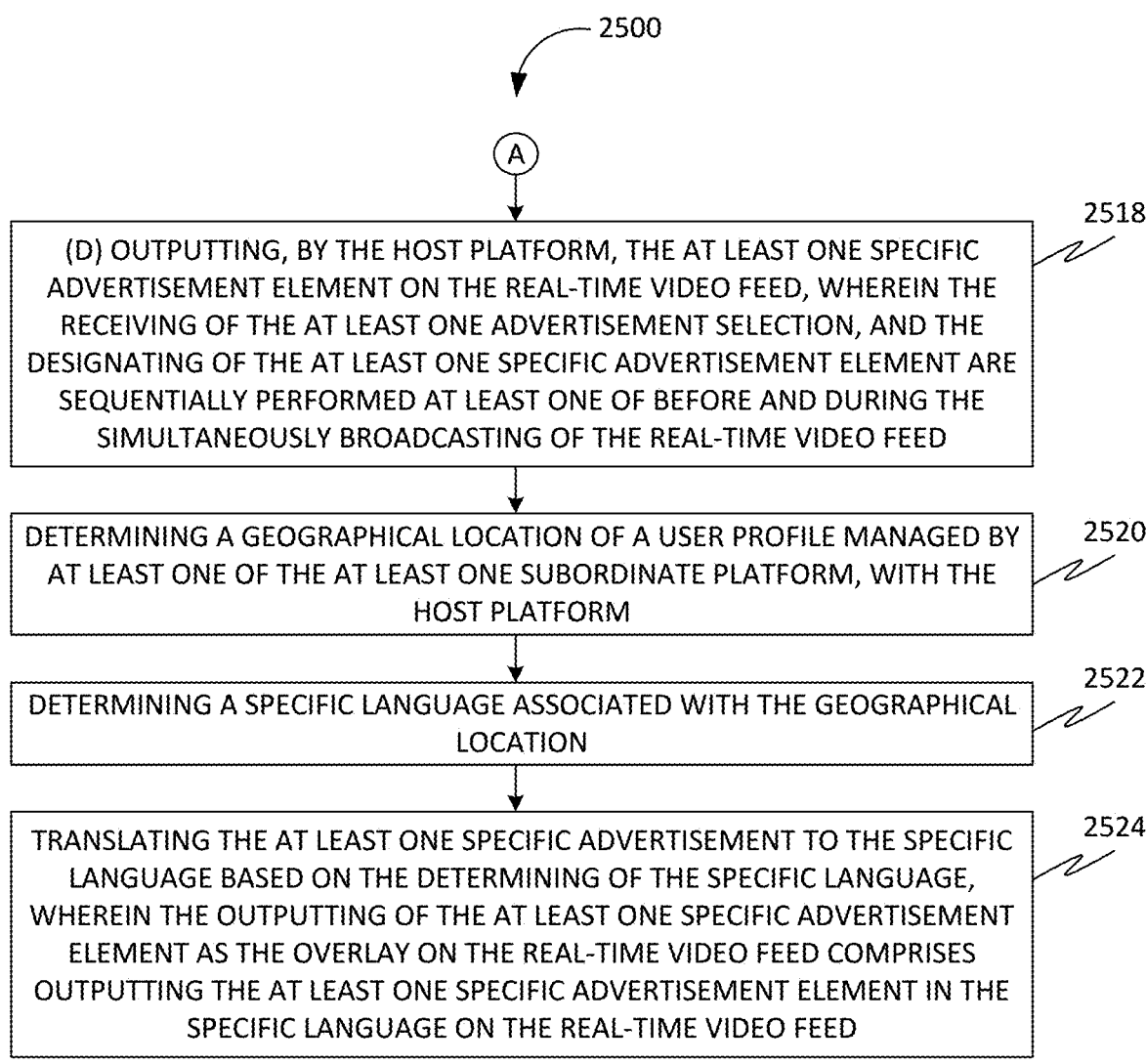
FIG. 26 is a continuation flowchart of the method 2500 of multi-platform social media advertising via digital overlays on real-time video feeds, in accordance with some embodiments.

FIG. 26 is a continuation flowchart of the method 2500 of multi-platform social media advertising via digital overlays on real-time video feeds, in accordance with some embodiments.

Figure 27:
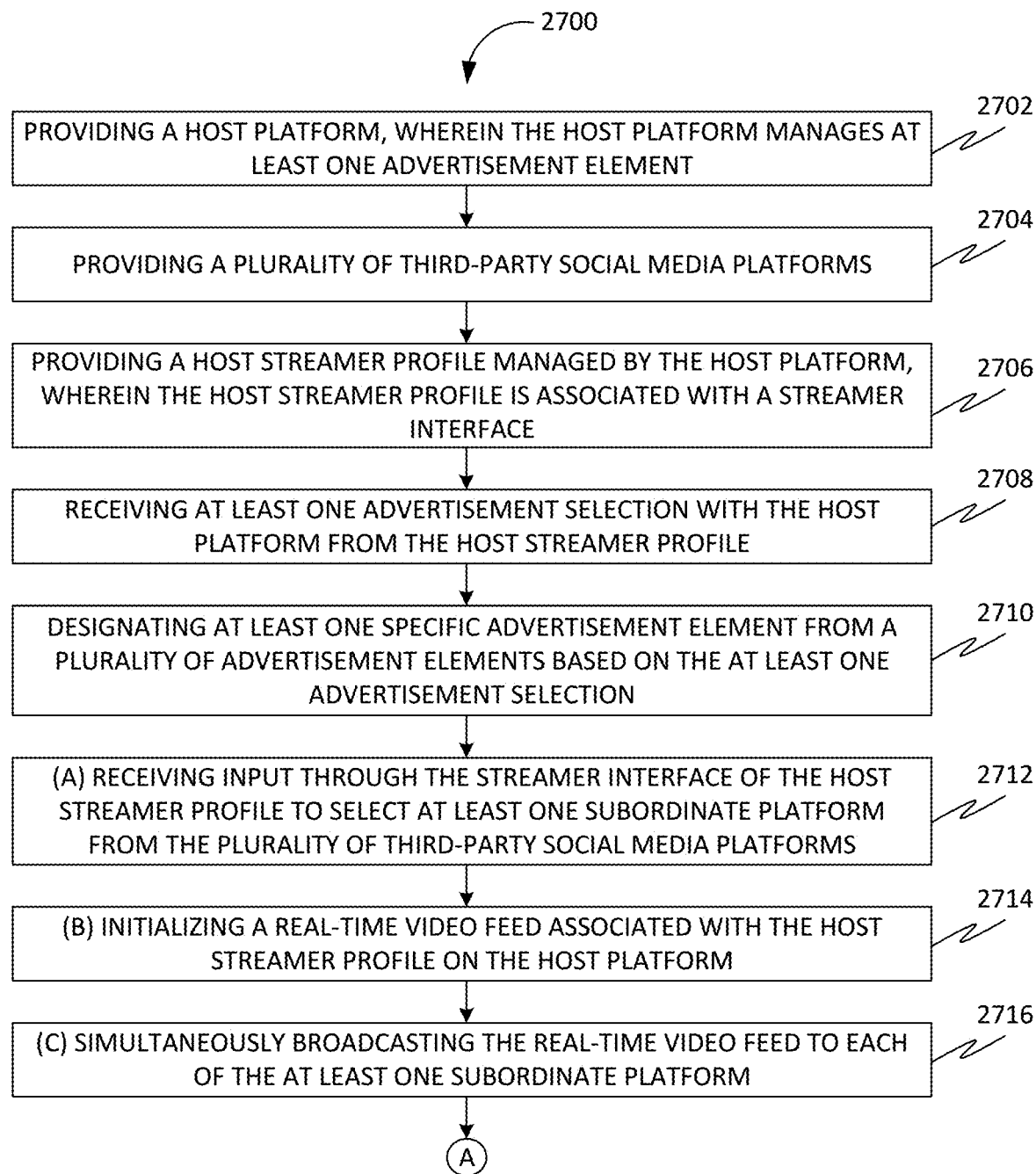
FIG. 27 is a flowchart of a method 2700 of multi-platform social media advertising via digital overlays on real-time video feeds, in accordance with some embodiments.

FIG. 27 is a flowchart of a method 2700 of multi-platform social media advertising via digital overlays on real-time video feeds, in accordance with some embodiments. Accordingly, the method 2700 may include a step 2702 of providing a host platform. Further, the host platform manages at least one advertisement element. Further, the host platform uses at least one processing unit to execute computer-executable instructions stored on a non-transitory computer-readable medium.

Further, the method 2700 may include a step 2704 of providing a plurality of third-party social media platforms.

Further, the method 2700 may include a step 2706 of providing a host streamer profile managed by the host platform. Further, the host streamer profile may be associated with a streamer interface.

Further, the method 2700 may include a step 2708 of receiving at least one advertisement selection with the host platform from the host streamer profile.

Further, the method 2700 may include a step 2710 of designating at least one specific advertisement element from a plurality of advertisement elements based on the at least one advertisement selection.

Further, the method 2700 may include a step A 2712 of receiving input through the streamer interface of the host streamer profile to select at least one subordinate platform from the plurality of third-party social media platforms.

Further, the method 2700 may include a step B 2714 of initializing a real-time video feed associated with the host streamer profile on the host platform.

Further, the method 2700 may include a step C 2716 of simultaneously broadcasting the real-time video feed to each of the at least one subordinate platform. Further, the method 2700 may include a step D 2718 of outputting, by the host platform, the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection, and the designating of the at least one specific advertisement element may be sequentially performed at least one of before and during the simultaneously broadcasting of the real-time video feed.

Further, the method 2700 may include a step 2720 of obtaining at least one information associated with a user profile managed by at least one of the at least one subordinate platform, with the host platform. Further, the at least one information may be of at least one activity associated with the user profile.

Further, the method 2700 may include a step 2722 of analyzing the at least one information using at least one algorithm.

Further, the method 2700 may include a step 2724 of generating at least one insight about a user associated with the user profile based on the analyzing of the at least one information.

Further, the method 2700 may include a step 2726 of providing the at least one insight to at least one of a plurality of first users.

Figure 28:
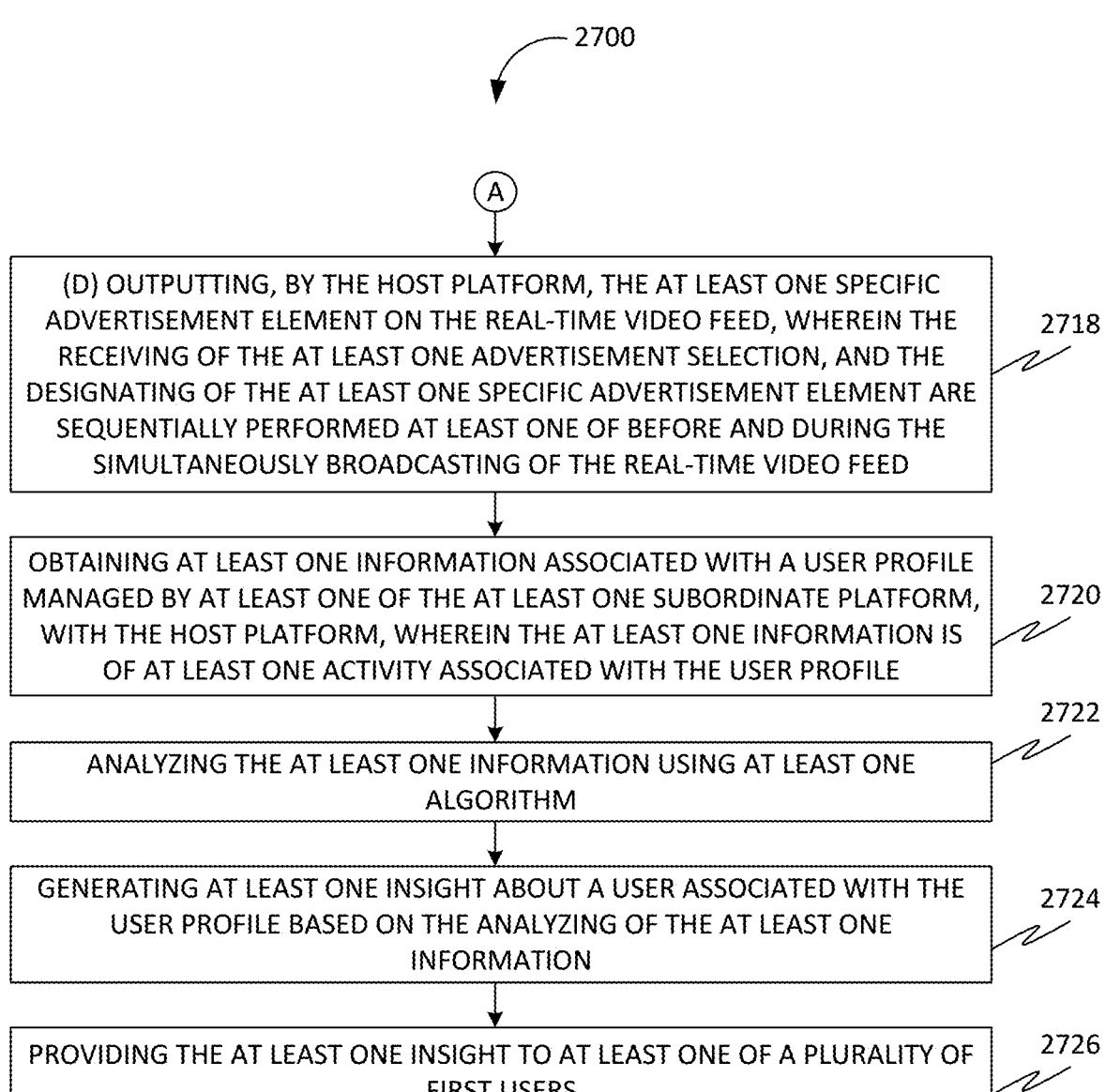
FIG. 28 is a continuation flowchart of the method 2700 of multi-platform social media advertising via digital overlays on real-time video feeds, in accordance with some embodiments.

FIG. 28 is a continuation flowchart of the method 2700 of multi-platform social media advertising via digital overlays on real-time video feeds, in accordance with some embodiments.

According to some embodiments, a system for multi-platform social media advertising via digital overlays on real-time video feeds is disclosed. Further, the system may include a host platform. Further, the host platform may be configured for managing at least one advertisement element. Further, the host platform uses at least one processing unit to execute computer-executable instructions stored on a non-transitory computer-readable medium. Further, the host platform may be configured for providing a plurality of third-party social media platforms. Further, the host platform may be configured for providing a host streamer profile. Further, the host streamer profile may be managed by the host platform. Further, the host streamer profile may be associated with a streamer interface. Further, the host platform may be configured for receiving at least one advertisement selection from the host streamer profile. Further, the host platform may be configured for designating at least one specific advertisement element from a plurality of advertisement elements based on the at least one advertisement selection. Further, the host platform may be configured for (A) receiving input through the streamer interface of the host streamer profile to select at least one subordinate platform from the plurality of third-party social media platforms. Further, the host platform may be configured for (B) initializing a real-time video feed associated with the host streamer profile on the host platform. Further, the host platform may be configured for (C) simultaneously broadcasting the real-time video feed to each of the at least one subordinate platform. Further, the host platform may be configured for (D) outputting the at least one specific advertisement element on the real-time video feed. Further, the at least one specific advertisement element may be outputted as an overlay on the real-time video feed. Further, the real-time video feed remains unchanged by the outputting of the at least one specific advertisement element. Further, the receiving of the at least one advertisement selection and the designating of the at least one specific advertisement element are sequentially performed at least one of before and during the simultaneously broadcasting of the real-time video feed. Further, at least one of the real-time video feed and the at least one specific advertisement element may be a streaming media.

Further, in some embodiments, the host platform may be further configured for obtaining at least one information associated with a user profile managed by at least one of the at least one subordinate platform. Further, the at least one information may be of at least one activity associated with the user profile. Further, the host platform may be configured for analyzing the at least one information using at least one algorithm. Further, the host platform may be configured for generating at least one insight about a user associated with the user profile based on the analyzing of the at least one information. Further, the host platform may be configured for providing the at least one insight to at least one of a plurality of first users.

Further, in an embodiment, the real-time video feed and the at least one specific advertisement element as the overlay on the real-time video feed are presented using at least one of a plurality of devices associated with the at least one subordinate platform based on the simultaneously broadcasting and the outputting.

Further, in an embodiment, the host platform may be further configured for detecting an interaction of a user using a first device of the plurality of devices. Further, the interaction may be associated with the at least one specific advertisement element. Further, the first device may be associated with the at least one subordinate platform. Further, the host platform may be configured for generating a haptic response in reaction to the interaction, through the first device based on the interaction and the at least one specific advertisement element Further, in an embodiment, at least one of the plurality of devices may include at least one holographic display device. Further, the at least one specific advertisement element may include at least one holographic element. Further, the presenting of the at least one specific advertisement element as the overlay on the real-time video feed may include displaying the at least one holographic element as the overlay on the real-time video feed. Further, the at least one holographic element may tactually be at least one of senses and interacts with at least one of an individual and an object using a reversed haptic technology. Further, the at least one holographic element may be tactually at least one of interacted and sensed by at least one of the individual and the object.

Although the invention has been explained in relation to its preferred embodiment, it is to be understood that many other possible modifications and variations can be made without departing from the spirit and scope of the invention as hereinafter claimed.

What is claimed is:
1. A method of multi-platform media advertising via digital overlays on real-time video feeds comprising:
   providing a host platform, wherein the host platform manages at least one advertisement element, wherein the host platform is managed by at least one host server with at least one processing unit to execute computer-executable instructions stored on a non-transitory computer-readable medium;
   providing a plurality of third-party media platforms, wherein each of the plurality of third-party media platforms is managed by a corresponding media server, wherein the corresponding media server is communicably coupled with the host server via the Internet;

providing a host streamer profile managed by the host platform, wherein the host streamer profile is associated with a streamer interface, wherein the streamer interface is managed by a streamer processor-based device, wherein the streamer processor-based device is communicably coupled with the host server via the Internet;
   receiving, by the host server, at least one advertisement selection with the host platform from the host streamer profile;
   designating, by the host server, at least one specific advertisement element from a plurality of advertisement elements based on the at least one advertisement selection;
   receiving, by the streamer processor-based device, input through the streamer interface of the host streamer profile to select at least one subordinate platform from the plurality of third-party media platforms;
   initializing, by the host server, a real-time video feed associated with the host streamer profile on the host platform;
   simultaneously broadcasting, by the host server, the real-time video feed to each of the at least one subordinate platform; and
   outputting, through the host platform by the host server, the at least one specific advertisement element on the real-time video feed, wherein the at least one specific advertisement element is outputted as an overlay on the real-time video feed, wherein the real-time video feed remains unchanged by the outputting of the at least one specific advertisement element, wherein at least one of the real-time video feed and the at least one specific advertisement element is a streaming media on the corresponding media server, wherein the real-time video feed and the at least one specific advertisement element as the overlay on the real-time video feed are presented using at least one of a plurality of devices associated with the at least one subordinate platform based on the simultaneously broadcasting and the outputting, wherein at least one of the plurality of devices comprises at least one holographic display device, wherein the at least one specific advertisement element comprises at least one holographic element, wherein the presenting of the at least one specific advertisement element as the overlay on the real-time video feed comprises displaying the at least one holographic element as the overlay on the real-time video feed, wherein the at least one holographic element tactually at least one of senses and interacts with at least one of an individual and an object using a reversed haptic technology, wherein the at least one holographic element is tactually at least one of interacted and sensed by at least one of the individual and the object.

2. The method of multi-platform media advertising via digital overlays on real-time video feeds as claimed in claim 1, wherein the at least one specific advertisement element is characterized by at least one of a presentation characteristic and a duration, wherein the method further comprises a step of determining at least one of a specific presentation characteristic and a specific duration for the at least one specific advertisement element in relation to the real-time video feed, wherein the outputting of the at least one specific advertisement element is based on the determining of at least one of the specific presentation characteristic and the specific duration, wherein the at least one specific advertisement element is outputted as the overlay with at least one of the specific presentation characteristic and the specific duration on the real-time video feed.

3. The method of multi-platform media advertising via digital overlays on real-time video feeds as claimed in claim 1 comprising steps of:

determining a geographical location of a user profile managed by at least one of the at least one subordinate platform, with the host platform;

determining a specific language associated with the geographical location; and translating the at least one specific advertisement element to the specific language based on the determining of the specific language, wherein the outputting of the at least one specific advertisement element as the overlay on the real-time video feed comprises outputting the at least one specific advertisement element in the specific language on the real-time video feed.

4. The method of multi-platform media advertising via digital overlays on real-time video feeds as claimed in claim 1 comprising steps of:

obtaining at least one information associated with a user profile managed by at least one of the at least one subordinate platform, with the host platform, wherein the at least one information is of at least one activity associated with the user profile;

analyzing the at least one information using at least one algorithm;

generating at least one insight about a user associated with the user profile based on the analyzing of the at least one information; and providing the at least one insight to at least one of a plurality of first users.

5. The method of multi-platform media advertising via digital overlays on real-time video feeds as claimed in claim 1 comprising steps of:

detecting an interaction of a user using a first device of the plurality of devices, wherein the interaction is associated with the at least one specific advertisement element, wherein the first device is associated with the at least one subordinate platform; and generating a haptic response in reaction to the interaction, through the first device based on the interaction and the at least one specific advertisement element.

6. The method of multi-platform media advertising via digital overlays on real-time video feeds as claimed in claim 1 comprising steps of:

detecting a plurality of interactions of a plurality of users using a plurality of second devices of the plurality of devices, wherein the plurality of interactions is associated with the at least one specific advertisement element, wherein the plurality of second devices is associated with the at least one subordinate platform, wherein the plurality of second devices are in a shared environment; and generating a haptic response in reaction to the plurality of interactions, uniformly through the plurality of second devices based on the plurality of interactions and the at least one specific advertisement element.

7. The method of multi-platform media advertising via digital overlays on real-time video feeds as claimed in claim 1 comprising steps of:

detecting at least one factor associated with a color shifting during the presenting of the real-time video feed and the at least one specific advertisement element as the overlay on the real-time video, using at least one of the plurality of devices;

generating at least one factor data based on the detecting of the at least one factor;

analyzing the at least one factor data using at least one algorithm;

receiving a selection of a perfect or an imperfect in relation to pixels in an image associated with at least one of the real-time video feed and the at least one specific advertisement element from the color shifting by a user;

detecting an instance of the color shifting associated with the presenting of the real-time video feed and the at least one specific advertisement element as the overlay on the real-time video, using at least one of the plurality of devices, based on the analyzing of the at least one factor data and the selection; and dynamically correcting a color inconsistency associated with the presenting of the real-time video feed and the at least one specific advertisement element as the overlay on the real-time video, using at least one of the plurality of devices, based on the detecting of the instance of the color shifting.

8. The method of multi-platform media advertising via digital overlays on real-time video feeds as claimed in claim 1, wherein at least one of the plurality of devices comprises at least one extended reality device, wherein the presenting of the at least one specific advertisement element as the overlay on the real-time video feed comprises presenting the at least one specific advertisement element as the overlay on the real-time video feed in at least one extended reality environment.

9. The method of multi-platform media advertising via digital overlays on real-time video feeds as claimed in claim 1 comprising steps of:

generating an environmental data of an environment of at least one of a plurality of users by detecting an environmental condition of the environment using at least one of a plurality of devices;

analyzing the environmental data;

determining at least one customization to the at least one specific advertisement element outputted as the overlay on the real-time video feed based on the analyzing of the environmental data; and customizing the at least one specific advertisement element outputted as the overlay on the real-time video feed based on the at least one customization.

10. The method of multi-platform media advertising via digital overlays on real-time video feeds as claimed in claim 1 comprising steps of:

generating a user data of at least one of a plurality of users by detecting a user state of the user using at least one of a plurality of devices;

analyzing the user data;

determining at least one customization to the at least one specific advertisement element outputted as the overlay on the real-time video feed based on the analyzing of the user data; and customizing the at least one specific advertisement element outputted as the overlay on the real-time video feed based on the at least one customization.

11. The method of multi-platform media advertising via digital overlays on real-time video feeds as claimed in claim 1 comprising steps of:

initiating a biometric verification of a user;

collecting one or more biometrics of the user based on the initiating;

verifying the user based on the one or more biometrics; and creating a digital overlay representing an identity of the user in at least one of a physical environment and an extended reality environment based on the verifying of the user, wherein the digital overlay is based on a nonfungible token, wherein the real-time video feed and the at least one specific advertisement element outputted as the overlay on the real-time video feed are presented in at least one of the physical environment and the extended reality environment.

12. The method of multi-platform media advertising via digital overlays on real-time video feeds as claimed in claim 11 comprising steps of:

detecting an interaction of the user performed through the digital overlay, using a device, wherein the interaction is associated with one or more elements comprised in the at least one specific advertisement element; and enabling a performance of one or more actions, through the device based on the interaction.

13. A method of multi-platform media advertising via digital overlays on real-time video feeds comprising:

providing a host platform, wherein the host platform manages at least one advertisement element, wherein the host platform is managed by at least one host server with at least one processing unit to execute computer-executable instructions stored on a non-transitory computer-readable medium;

providing a plurality of third-party media platforms, wherein each of the plurality of third-party media platforms is managed by a corresponding media server, wherein the corresponding media server is communicably coupled with the host server via the Internet;

providing a host streamer profile managed by the host platform, wherein the host streamer profile is associated with a streamer interface, wherein the streamer interface is managed by a streamer processor-based device, wherein the streamer processor-based device is communicably coupled with the host server via the Internet;

receiving, by the host server, at least one advertisement selection with the host platform from the host streamer profile;

designating, by the host server, at least one specific advertisement element from a plurality of advertisement elements based on the at least one advertisement selection;

receiving, by the streamer processor-based device, input through the streamer interface of the host streamer profile to select at least one subordinate platform from the plurality of third-party media platforms;

initializing, by the host server, a real-time video feed associated with the host streamer profile on the host platform;

simultaneously broadcasting, by the host server, the real-time video feed to each of the at least one subordinate platform; and outputting, through the host platform by the host server, the at least one specific advertisement element on the real-time video feed, wherein the at least one specific advertisement element is outputted as an overlay on the real-time video feed, wherein the real-time video feed remains unchanged by the outputting of the at least one specific advertisement element, wherein at least one of the real-time video feed and the at least one specific advertisement element is a streaming media on the corresponding media server, wherein the real-time video feed and the at least one specific advertisement element as the overlay on the real-time video feed are presented using at least one of a plurality of devices associated with the at least one subordinate platform based on the simultaneously broadcasting and the outputting, wherein at least one of the plurality of devices comprises at least one holographic display device, wherein the at least one specific advertisement element comprises at least one holographic element, wherein the presenting of the at least one specific advertisement element as the overlay on the real-time video feed comprises displaying the at least one holographic element as the overlay on the real-time video feed, wherein the at least one holographic element tactually at least one of senses and interacts with at least one of an individual and an object using a reversed haptic technology, wherein the at least one holographic element is tactually at least one of interacted and sensed by at least one of the individual and the object.

14. A system for multi-platform media advertising via digital overlays on real-time video feeds comprising:

a host platform configured for managing at least one advertisement element, wherein the host platform is managed by at least one host server with at least one processing unit to execute computer-executable instructions stored on a non-transitory computer-readable medium, wherein the host platform is further configured for:

providing a host platform, wherein the host platform manages at least one advertisement element, wherein the host platform is managed by at least one host server with at least one processing unit to execute computer-executable instructions stored on a non-transitory computer-readable medium;

providing a plurality of third-party media platforms, wherein each of the plurality of third-party media platforms is managed by a corresponding media server, wherein the corresponding media server is communicably coupled with the host server via the Internet;

providing a host streamer profile managed by the host platform, wherein the host streamer profile is associated with a streamer interface, wherein the streamer interface is managed by a streamer processor-based device, wherein the streamer processor-based device is communicably coupled with the host server via the Internet;

receiving, by the host server, at least one advertisement selection with the host platform from the host streamer profile;

designating, by the host server, at least one specific advertisement element from a plurality of advertisement elements based on the at least one advertisement selection;

receiving, by the streamer processor-based device, input through the streamer interface of the host streamer profile to select at least one subordinate platform from the plurality of third-party media platforms;

initializing, by the host server, a real-time video feed associated with the host streamer profile on the host platform;

simultaneously broadcasting, by the host server, the real-time video feed to each of the at least one subordinate platform; and outputting, through the host platform by the host server, the at least one specific advertisement element on the real-time video feed, wherein the at least one specific advertisement element is outputted as an overlay on the real-time video feed, wherein the real-time video feed remains unchanged by the outputting of the at least one specific advertisement element, wherein at least one of the real-time video feed and the at least one specific advertisement element is a streaming media on the corresponding media server, wherein the real-time video feed and the at least one specific advertisement element as the overlay on the real-time video feed are presented using at least one of a plurality of devices associated with the at least one subordinate platform based on the simultaneously broadcasting and the outputting, wherein at least one of the plurality of devices comprises at least one holographic display device, wherein the at least one specific advertisement element comprises at least one holographic element, wherein the presenting of the at least one specific advertisement element as the overlay on the real-time video feed comprises displaying the at least one holographic element as the overlay on the real-time video feed, wherein the at least one holographic element tactually at least one of senses and interacts with at least one of an individual and an object using a reversed haptic technology, wherein the at least one holographic element is tactually at least one of interacted and sensed by at least one of the individual and the object.

15. The system for multi-platform media advertising via digital overlays on real-time video feeds as claimed in claim 14, wherein the host platform is further configured for:
obtaining at least one information associated with a user profile managed by at least one of the at least one subordinate platform, wherein the at least one information is of at least one activity associated with the user profile;
analyzing the at least one information using at least one algorithm;
generating at least one insight about a user associated with the user profile based on the analyzing of the at least one information; and
providing the at least one insight to at least one of a plurality of first users.

16. The system for multi-platform media advertising via digital overlays on real-time video feeds as claimed in claim 1, wherein the host platform is further configured for:
detecting an interaction of a user using a first device of the plurality of devices, wherein the interaction is associated with the at least one specific advertisement element, wherein the first device is associated with the at least one subordinate platform; and
generating a haptic response in reaction to the interaction, through the first device based on the interaction and the at least one specific advertisement element.

* * * * *